United States Patent [19]

Koopmans et al.

[11] Patent Number: 5,121,477
[45] Date of Patent: Jun. 9, 1992

[54] SYSTEM FOR INTERACTIVELY CREATING ACTION BAR PULL-DOWN WINDOWS OF A USER INTERFACE FOR USE AT PROGRAM RUN TIME

[75] Inventors: Sytze T. Koopmans, EZ Alphen an der Rijn, Netherlands; Susan L. C. Watson, Round Rock, Tex.

[73] Assignee: International Business Machines Inc., Armonk, N.Y.

[21] Appl. No.: 179,468

[22] Filed: Apr. 8, 1988

[51] Int. Cl.⁵ .............................................. G06F 3/03
[52] U.S. Cl. ................................ 395/156; 395/157; 364/286.3; 364/286.2; 364/286.1; 364/226.1
[58] Field of Search ............... 340/710; 364/518, 521, 364/200 MS File, 900 MS File

[56] References Cited

U.S. PATENT DOCUMENTS

| | | | |
|---|---|---|---|
| Re. 32,633 | 3/1988 | Hovey | 340/710 |
| 4,460,975 | 7/1984 | Torkelsen et al. | |
| 4,531,186 | 7/1985 | Knapman | |
| 4,555,775 | 11/1985 | Pike | 364/900 |
| 4,586,158 | 4/1986 | Brandle | |
| 4,587,520 | 5/1986 | Astle | 340/710 |
| 4,611,306 | 9/1986 | Crehan | 364/900 |
| 4,642,790 | 2/1987 | Minshull | 364/900 |
| 4,648,062 | 3/1987 | Johnson et al. | 364/900 |
| 4,656,603 | 4/1987 | Dunn | 364/900 |
| 4,688,195 | 8/1987 | Thompson | 364/300 |
| 4,700,297 | 10/1987 | Hagel, Sr. | |
| 4,723,209 | 2/1988 | Hernandez | 364/51 |
| 4,727,473 | 2/1988 | Anderson | 364/188 |
| 4,752,889 | 6/1988 | Rappaport | 364/513 |
| 4,761,642 | 8/1988 | Huntzinger | 364/721 |
| 4,763,356 | 8/1988 | Day | 364/900 |
| 4,772,882 | 9/1988 | Mical | 340/710 |
| 4,789,962 | 12/1988 | Berry et al. | 364/721 |
| 4,791,561 | 12/1988 | Huber | 364/200 |
| 4,805,099 | 2/1989 | Huber | 364/200 |
| 4,807,142 | 2/1989 | Agarwal | 364/200 |
| 4,835,700 | 5/1989 | Tanaka | 364/192 |
| 4,845,665 | 7/1989 | Heath | 364/900 |
| 4,862,390 | 8/1989 | Weiner | 340/710 |
| 4,870,561 | 9/1989 | Love | 364/200 |
| 4,885,704 | 12/1989 | Takagi | 340/710 |
| 4,945,476 | 7/1990 | Bodick | 364/413.02 |

FOREIGN PATENT DOCUMENTS 0243671 3/1987 European Pat. Off.

OTHER PUBLICATIONS

*IEEE*, "The Dante Application Interface" by D. R. Kuokka and D. Giuse.

(List continued on next page.)

Primary Examiner—Thomas C. Lee
Assistant Examiner—Eric Coleman
Attorney, Agent, or Firm—Casimer K. Salys; Robert M. Carwell

[57] ABSTRACT

Customized screens are generated in accordance with the invention for interfacing with an application program in an information processing system. During a panel definition phase when a panel designer creates a customized panel, panel actions are selected from a default list of panel operations and commands, including searching, adding, changing or deleting data from a database, showing long fields, blanking out a panel, displaying a prior panel, and printing. The actions are specified in a pop-up window during panel definition. Mnemonics and function keys may be specified for each action. The invention dynamically creates pull-down windows based on the actions specified which become part of the panel interface available to the run time user from an application action bar. Users may select actions to interact with the panel in like manner to interaction with other portions of the application user interface by means of cursor selection, input of the action number, mnemonics, or activation of a function key. Also during panel design a custom word or phrase for the panel action may be specified for subsequent display in the pull-down windows during run time. A mode such as Add data or Change data is specified for each selected panel action item during panel definition. During panel run time, and after selection of an execution mode, panel actions pull-down windows previously thereby designed may be displayed. A list of only those panel actions previously selected in the panel actions design pop-up window corresponding to the execution mode selected appears.

24 Claims, 67 Drawing Sheets

```
ACTIONS  SPECIFY  LAYOUT  EXIT        24    22      | F1=HELP
                        PANEL "ORDER_FORM"   20         SCREEN  1 OF  1

28   PANEL ACTIONS       32               34
          26          MNEMONIC  ACTION KEY   PANEL OPERATION/COMMAND   MODE
ACTION TEXT

[ADD AND NEXT      ] [A] [CTRL+F2   ] [ADD AND NEXT  ~36 ] 66~[A]
[PREVIOUS          ] [V] [F7        ] [PREVIOUS           ]    [A]
[BLANK PANEL       ] [B] [SHIFT+F10 ] [BLANK PANEL        ]    [ ]
[SHOW FIELD        ] [F] [SHIFT+F7  ] [SHOW FIELD         ]  ] [ ]
[PRINT             ] [P] [F9        ] [PRINT              ] 68[ ]
[CHANGE AND NEXT   ] [C] [CTRL+F1   ] [CHANGE AND NEXT ~36] ~[C]
[DELETE AND NEXT   ] [D] [CTRL+F9   ] [DELETE AND NEXT    ]    [C]
[NEXT              ] [N] [F8        ] [NEXT               ]    [C]
[SEARCH            ] [S] [CTRL+F6   ] [SEARCH             ]    [C]
[COMPUTE           ] [O] [          ] [COMPUTE ~38        ]    [ ]
[                  ] [ ] [          ] [                   ]    [ ]
[                  ] [ ] [          ] [                   ]    [ ]

PANEL ACTIONS POP-UP WINDOW WITH DEFAULT VALUES
```

OTHER PUBLICATIONS

IBM Systems Journal, vol. 26, No. 2, by P. Halpern, S. M. Roberts and L. Lopez, "An Incidence-Matrix-Driven Panel System for the IBM PC".

IBM Technical Disclosure Bulletin, vol. 28, No. 10, Mar. 1986, pp. 4369-4370, "Application Generator for a Personal Computer".

"Creating Highly-Interactive and Graphical User Interfaces by Demonstration", by Myers and Buxton, Journal of Association for Computing Machinery, vol. 20, No. 4, 1986, pp. 249 et seq.

"IconMaker—Interactive User Interface Design", by Kramer, IEEE Journal, Sep. 1984, pp. 192 et seq.

"Management of Interactive Graphics Functionality Beyond GKS", by Chauhan, Proceedings of the Fourth International Conference on Engineering Software, 1985, pp. 2-31 et seq.

"Helix and The Mac Make A Team", Micro Decision, Sep. 1985, pp. 39 et seq.

| ACTIONS SPECIFY LAYOUT EXIT | | | F1=HELP |
|---|---|---|---|

PANEL "ORDER_FORM"          SCREEN 1 OF 1

PANEL ACTIONS

| ACTION TEXT | MNEMONIC | ACTION KEY | PANEL OPERATION/COMMAND | MODE |
|---|---|---|---|---|
| [ADD AND NEXT | [A] | [CTRL+F2] | [ADD AND NEXT] | [A] |
| [PREVIOUS | [V] | [F7] | [PREVIOUS] | [A] |
| [BLANK PANEL | [B] | [SHIFT+F10] | [BLANK PANEL] | [ ] |
| [SHOW FIELD | [F] | [SHIFT+F7] | [SHOW FIELD] | [ ] |
| [PRINT | [P] | [F9] | [PRINT] | [ ] |
| [CHANGE AND NEXT | [C] | [CTRL+F1] | [CHANGE AND NEXT] | [C] |
| [DELETE AND NEXT | [D] | [CTRL+F9] | [DELETE AND NEXT] | [C] |
| [NEXT | [N] | [F8] | [NEXT] | [C] |
| [SEARCH | [S] | [CTRL+F6] | [SEARCH] | [C] |
| [COMPUTE | [O] | [ ] | [COMPUTE] | [ ] |
| [ | [ ] | [ ] | [ ] | [ ] |
| [ | [ ] | [ ] | [ ] | [ ] |

PANEL ACTIONS POP-UP WINDOW WITH DEFAULT VALUES

FIG. 2

PANEL ACTIONS POP-UP WINDOW WITH PANEL OPERATIONS LIST WINDOW DISPLAYED

ACTIONS  SPECIFY  LAYOUT  EXIT | F1=HELP

PANEL "ORDER_FORM"　　　　　　　　SCREEN 1 OF 1

PANEL ACTIONS

| ACTION TEXT | MNEMONIC | ACTION KEY | PANEL OPERATION/COMMAND | MODE |
|---|---|---|---|---|
| [ADD ITEM           ] | [A] | [CTRL+F2  ] | [ADD AND NEXT           ] | [A] |
| [PREVIOUS ITEM ADDED] | [B] | [         ] | [PREVIOUS               ] | [A] |
| [CHANGE ITEM        ] | [C] | [CTRL+F1  ] | [CHANGE AND NEXT        ] | [C] |
| [DELETE ITEM        ] | [D] | [CTRL+F9  ] | [DELETE AND NEXT        ] | [C] |
| [NEXT               ] | [N] | [F8       ] | [NEXT                   ] | [C] |
| [SEARCH             ] | [S] | [CTRL+F6  ] | [SEARCH                 ] | [C] |
| [UPDATE BALANCE     ] | [U] | [         ] | [RUN PROC UPDATE_BALANCE] | [ ] |
| [PRINT ORDER        ] | [P] | [F9       ] | [PRINT                  ] | [ ] |
| [BLANK PANEL        ] | [B] | [SHIFT+F10] | [BLANK PANEL            ] | [ ] |
| [                   ] | [ ] | [         ] | [                       ] | [ ] |
| [                   ] | [ ] | [         ] | [                       ] | [ ] |

~82

PANEL ACTIONS WINDOW AFTER CHANGES HAVE BEEN MADE

FIG. 4

```
┌─────────────────────────────────────────────────────────────────────┐
│ ACTIONS  EXIT                          |            F1=HELP         │
│                                                                     │
│              CUSTOMER ORDER FORM         SCREEN  1 OF 1             │
│                                                                     │
│  ORDER#    [   ]                                                    │
│  CUSTOMER  [ ]─94                                                   │
│  ADDRESS   [ ]                                                      │
│                                                                     │
│  # OF ITEMS   ITEM DESCRIPTION    UNIT PRICE      COST              │
│   [    ]      [        ]          [    ]         [   ]              │
│   [    ]      [        ]          [    ]         [   ]              │
│                                                                     │
│                                   SUBTOTAL                          │
│                                   TAX                               │
│                                   TOTAL                             │
│                                                                     │
│                   PANEL EXECUTION WINDOW                            │
└─────────────────────────────────────────────────────────────────────┘
```
96 (label pointing to ORDER# area)

FIG. 5

```
ACTIONS  EXIT                              |           | F1=HELP
                                           DER FORM    SCREEN 1 OF 1
> 1. CHANGE ITEM       CTRL+F1
  2. DELETE ITEM       CTRL+F9
  3. NEXT              F8
112 4. SEARCH          CTRL+F6             UNIT PRICE    COST
  5. UPDATE BALANCE    F9
  6. PRINT ORDER       F9
  7. BLANK PANEL       SHIFT+F10
                                           SUBTOTAL
              110                          TAX
                                           TOTAL
```

ACTIONS PULL-DOWN WINDOW FOR CHANGE DATA ROWS MODE

FIG. 6

```
┌─────────────────────────────────────────────────────────────────┐
│ ACTIONS  EXIT                                       │  F1=HELP  │
├──────────────────────────────┬──────────────────────┴───────────┤
│ 1. ADD ITEM          CTRL+F2 │DER FORM           SCREEN 1 OF 1  │
│ 2. PREVIOUS ITEM ADDED       │                                  │
│ 3. UPDATE BALANCE            │                                  │
│ 4. PRINT ORDER            F9 │                                  │
│ 5. BLANK PANEL      SHIFT+F10│                                  │
└──────────────────────────────┘── 114                            │

# OF ITEMS   ITEM DESCRIPTION      UNIT PRICE       COST       
    [_ _ _]     [_ _ _]               [_ _ _ _]       [_ _ _ _]   
    [_ _ _]     [_ _ _]               [_ _ _ _]       [_ _ _ _]

SUBTOTAL                     
                                      TAX                          
                                      TOTAL                        
```

ACTIONS PULL-DOWN WINDOW FOR ADD DATA ROWS MODE

FIG. 7

TABLE EMPLOYEE

| -SERIAL | LAST | FIRST | MI | DEPT | ZIP | DIV | LOC | PHONE |
|---|---|---|---|---|---|---|---|---|

TABLE COURSE_CATALOG

| -COURSE | TITLE | ABSTRACT |
|---|---|---|

TABLE CLASS_SCHEDULE

| -COURSE | -SECTION | STARTDATE | ENDDATE | STARTTIME | ROOM | BLDG |
|---|---|---|---|---|---|---|

TABLE COURSE_ENROLL

| -COURSE | -SECTION | -SERIAL_NO | VM_NODE | VM_USERID |
|---|---|---|---|---|

SPECIFY PULL-DOWN WINDOW WITH "TABLE SELECTIONS" CHOSEN

```
ACTIONS   SPECIFY   LAYOUT   EXIT                    | F1=HELP

PANEL "ENROLL"                SCREEN 1 OF 1

TABLE SELECTIONS

TABLE TYPE          TABLE NAME

ROOT . . . . . .    _____
          SUB. . . . . . .    _____
          LOOKUP1. . . . .    _____
          LOOKUP2. . . . .    _____
          LOOKUP3. . . . .    _____
          LOOKUP4. . . . .    _____
          LOOKUP5. . . . .    _____
          LOOKUP6. . . . .    _____
          LOOKUP7. . . . .    _____
          LOOKUP8. . . . .    _____
          LOOKUP9. . . . .    _____
```

ENROLL PANEL DEFINITION WINDOW ON ENTRY TO TABLE SELECTIONS POP-UP

FIG. 16

| ACTIONS SPECIFY LAYOUT EXIT | F1=HELP |
|---|---|

PANEL "ENROLL"  SCREEN 1 OF 1

```
            TABLE SELECTIONS

TABLE TYPE       TABLE NAME

ROOT . . . . . . [COURSE_ENROLL]
SUB. . . . . . . [EMPLOYEE     ]
LOOKUP1. . . . . [             ]
LOOKUP2. . . . . [             ]
LOOKUP3. . . . . [             ]
LOOKUP4. . . . . [             ]
LOOKUP5. . . . . [             ]
LOOKUP6. . . . . [             ]
LOOKUP7. . . . . [             ]
LOOKUP8. . . . . [             ]
LOOKUP9. . . . . [             ]
```

ENROLL PANEL DEFINITION WINDOW WITH TABLE SELECTIONS POP-UP FILLED IN

FIG. 17

SPECIFY PULL-DOWN WINDOW WITH "TABLE FIELDS" CHOSEN

```
ACTIONS  SPECIFY  LAYOUT  EXIT                               | F1=HELP

PANEL "ENROLL"                         SCREEN 1 OF 1

TABLE FIELDS

FIELD      TABLE            COLUMN NAME         USAGE   WIDTH
    NAME       TYPE
    ___        ___              _____         _____   _____
    ___        ___              _____         _____   _____
```

ENROLL PANEL DEFINITION WINDOW ON ENTRY TO TABLE FIELDS POP-UP

FIG. 19

| ACTIONS | SPECIFY | LAYOUT | EXIT | | F1=HELP |
|---|---|---|---|---|---|

PANEL "ENROLL"  SCREEN 1 OF 1

TABLE FIELDS

| FIELD NAME | TABLE TYPE | COLUMN NAME | USAGE | WIDTH |
|---|---|---|---|---|
| [CRSE    ] | [ROOT    ] | [COURSE    ] | [SAC] | [ 4] |
| [SECT    ] | [ROOT    ] | [SECTION   ] | [AC ] | [ 4] |
| [SERIAL  ] | [ROOT    ] | [SERIAL_NO ] | [SAC] | [ 6] |
| [NODE    ] | [ROOT    ] | [VM_NODE   ] | [AC ] | [ 8] |
| [USERID  ] | [ROOT    ] | [VM_USERID ] | [AC ] | [ 8] |
| [LASTNAME] | [LOOKUP1 ] | [LAST      ] | [   ] | [12] |
| [FIRST   ] | [LOOKUP1 ] | [FIRST     ] | [   ] | [12] |
| [I       ] | [LOOKUP1 ] | [MI        ] | [   ] | [ 1] |
| [DEP     ] | [LOOKUP1 ] | [DEPT      ] | [   ] | [ 3] |
| [ZIP     ] | [LOOKUP1 ] | [ZIP       ] | [   ] | [ 3] |
| [DIV     ] | [LOOKUP1 ] | [DIV       ] | [   ] | [ 3] |
| [LOC     ] | [LOOKUP1 ] | [LOC       ] | [   ] | [10] |
| [PHONE   ] | [LOOKUP1 ] | [PHONE     ] | [   ] | [ 8] |

ENROLL PANEL DEFINITION WINDOW WITH TABLE FIELDS POP-UP FILLED IN

FIG. 20

SPECIFY PULL-DOWN WINDOW WITH "CONNECTING COLUMNS" CHOSEN

| ACTIONS SPECIFY LAYOUT EXIT | F1=HELP |
|---|---|
| PANEL "ENROLL" | SCREEN 1 OF 1 |

CONNECTING COLUMNS

| FROM TABLE TYPE | COLUMN NAME | TO TABLE TYPE | COLUMN NAME |
|---|---|---|---|
| _____ | _____ | _____ | _____ |

ENROLL PANEL DEFINITION WINDOW ON ENTRY TO CONNECTING COLUMNS POP-UP

FIG. 22

| ACTIONS SPECIFY LAYOUT EXIT | | | F1=HELP |
|---|---|---|---|
| PANEL "ENROLL" | | SCREEN | 1 OF 1 |

CONNECTING COLUMNS

| FROM TABLE TYPE | COLUMN NAME | TO TABLE TYPE | COLUMN NAME |
|---|---|---|---|
| [ROOT      ] | [SERIAL_NO  ] | [LOOKUP1 ] | [SERIAL     ] |
| [          ] | [            ] | [         ] | [            ] |
| [          ] | [            ] | [         ] | [            ] |

ENROLL PANEL DEFINITION WINDOW WITH CONNECTING COLUMNS FILLED IN

FIG. 23

```
ACTIONS  SPECIFY  LAYOUT  EXIT                    | F1=HELP

PANEL "ENROLL"                   SCREEN 1 OF 1

COURSE NO.: [CRSE]       SECTION: [SECT]

LAST NAME: [LASTNAME    ] FIRST: [FIRST    ] MI: [I]
EMPLOYEE SERIAL: [SERIAL]  DEPT: [DEP]  ZIP: [ZIP]    DIV: [DIV]
VM USER ID: [USERID  ]   VM NODE: [NODE  ]
LOCATION: [LOC   ]
TIE/EXT: [PHONE    ]  (USE DASH TO SEPARATE TIELINE AND EXTENSION)

ENROLLMENT INSTRUCTIONS:
   FILL IN COURSE NO, SECTION, EMPLOYEE SERIAL, VM USER ID AND VM NODE.
   THEN CHOOSE THE "FILL IN EMPLOYEE DATA" IN THE ACTIONS WINDOW.
   TO SUBMIT THE ENROLLMENT, CHOOSE "ENROLL REQUEST" IN THE ACTIONS WINDOW.

CANCELLATION INSTRUCTIONS:
   FILL IN COURSE NO, SECTION AND EMPLOYEE SERIAL.
   THEN CHOOSE THE "FILL IN EMPLOYEE DATA" IN THE ACTIONS WINDOW.
   TO CANCEL THE REQUEST, CHOOSE "CANCEL ENROLLMENT" IN THE ACTIONS WINDOW.
```

PANEL DEFINITION WINDOW FILLED IN FOR ENROLL PANEL

FIG. 24

```
ACTIONS  SPECIFY  LAYOUT  EXIT                          | F1=HELP

SCREEN 1 OF 1
          1. TABLE SELECTIONS
          2. TABLE FIELDS
          3. CONNECTING COLUMNS
        > 4. PANEL ACTIONS
          5. TITLE LINE
COURSE N
LAST NAM
EMPLOYEE                            ]  MI: [I]        DIV: [DIV]
VM USER ID: [USERID  ]  VM NODE: [NODE         ]
LOCATION: [LOC                     ] [ZIP]
TIE/EXT: [PHONE      ] (USE DASH TO SEPARATE TIELINE AND EXTENSION)

ENROLLMENT INSTRUCTIONS:
  FILL IN COURSE NO, SECTION, EMPLOYEE SERIAL, VM USER ID AND VM NODE.
  THEN CHOOSE THE "FILL IN EMPLOYEE DATA" IN THE ACTIONS WINDOW.
  TO SUBMIT THE ENROLLMENT, CHOOSE "ENROLL REQUEST" IN THE ACTIONS WINDOW.

CANCELLATION INSTRUCTIONS:
  FILL IN COURSE NO, SECTION AND EMPLOYEE SERIAL.
  THEN CHOOSE THE "FILL IN EMPLOYEE DATA" IN THE ACTIONS WINDOW.
  TO CANCEL THE REQUEST, CHOOSE "CANCEL ENROLLMENT" IN THE ACTIONS WINDOW.
```

FIG. 25

SPECIFY PULL-DOWN WINDOW WITH "PANEL ACTIONS" CHOSEN

| ACTIONS | SPECIFY | LAYOUT | EXIT | | F1=HELP |
|---|---|---|---|---|---|

PANEL "ENROLL"   SCREEN 1 OF 1

PANEL ACTIONS

| ACTION TEXT | MNEMONIC | ACTION KEY | PANEL OPERATION/COMMAND | MODE |
|---|---|---|---|---|
| [ADD AND NEXT     ] | [A] | [CTRL+F2  ] | [ADD AND NEXT     ] | [A] |
| [PREVIOUS         ] | [V] | [F7        ] | [PREVIOUS         ] | [A] |
| [BLANK PANEL      ] | [B] | [SHIFT+F10 ] | [BLANK PANEL      ] | [ ] |
| [SHOW FIELD       ] | [F] | [SHIFT+F7  ] | [SHOW FIELD       ] | [ ] |
| [PRINT            ] | [P] | [F9        ] | [PRINT            ] | [ ] |
| [CHANGE AND NEXT  ] | [C] | [CTRL+F1   ] | [CHANGE AND NEXT  ] | [C] |
| [DELETE AND NEXT  ] | [D] | [CTRL+F9   ] | [DELETE AND NEXT  ] | [C] |
| [NEXT             ] | [N] | [F8        ] | [NEXT             ] | [C] |
| [SEARCH           ] | [S] | [CTRL+F6   ] | [SEARCH           ] | [C] |
| [COMPUTE          ] | [O] | [          ] | [COMPUTE          ] | [ ] |
| [                 ] | [ ] | [          ] | [                 ] | [ ] |
| [                 ] | [ ] | [          ] | [                 ] | [ ] |

ENROLL PANEL DEFINITION WINDOW ON ENTRY TO PANEL ACTIONS POP-UP

FIG. 26

ACTIONS SPECIFY LAYOUT EXIT | F1=HELP

PANEL "ENROLL"  SCREEN 1 OF 1

PANEL ACTIONS

| ACTION TEXT | MNEMONIC | ACTION KEY | PANEL OPERATION/COMMAND | MODE |
|---|---|---|---|---|
| [ENROLL REQUEST] | [E] | [CTRL+F2] | [ADD AND NEXT] | [A] |
| [CANCEL ENROLLMENT] | [C] | [CTRL+F9] | [DELETE AND NEXT] | [C] |
| [CHECK CLASS INFO] | [I] | [CTRL+F10] | [RUN PANEL CLASS_INFO] | [ ] |
| [FILL IN EMPLOYEE DATA] | [F] | [SHIFT+F9] | [COMPUTE] | [ ] |
| [PRINT REQUEST] | [P] | [F9] | [PRINT] | [ ] |
| [SKIP TO NEXT ENTRY] | [N] | [F8] | [NEXT] | [C] |
| [DO A SEARCH] | [S] | [CTRL+F6] | [SEARCH] | [C] |
| [RECALL LAST ENTRY] | [R] | [F7] | [PREVIOUS] | [A] |
| [BLANK PANEL] | [B] | [SHIFT+F10] | [BLANK PANEL] | [ ] |
| [ ] | [ ] | [ ] | [ ] | [ ] |
| [ ] | [ ] | [ ] | [ ] | [ ] |
| [ ] | [ ] | [ ] | [ ] | [ ] |

FIG. 27

ENROLL PANEL DEFINITION WINDOW WITH PANEL ACTIONS POP-UP FILLED IN

```
ACTIONS  SPECIFY  LAYOUT  EXIT                              | F1=HELP

SCREEN 1 OF 1
         ┌─────────────────────────┐
         │  1. TABLE SELECTIONS    │
         │  2. TABLE FIELDS        │
         │  3. CONNECTING COLUMNS  │
COURSE N │  4. PANEL ACTIONS       │
LAST NAM │> 5. TITLE LINE          ]  MI: [I]
EMPLOYEE └─────────────────────────┘  [ZIP]        DIV: [DIV]
VM USER ID: [USERID    ]   VM NODE: [NODE    ]
LOCATION: [LOC   ]
TIE/EXT: [PHONE    ]  (USE DASH TO SEPARATE TIELINE AND EXTENSION)

ENROLLMENT INSTRUCTIONS:
  FILL IN COURSE NO, SECTION, EMPLOYEE SERIAL, VM USER ID AND VM NODE.
  THEN CHOOSE THE "FILL IN EMPLOYEE DATA" IN THE ACTIONS WINDOW.
  TO SUBMIT THE ENROLLMENT, CHOOSE "ENROLL REQUEST" IN THE ACTIONS WINDOW.

CANCELLATION INSTRUCTIONS:
  FILL IN COURSE NO, SECTION AND EMPLOYEE SERIAL.
  THEN CHOOSE THE "FILL IN EMPLOYEE DATA" IN THE ACTIONS WINDOW.
  TO CANCEL THE REQUEST, CHOOSE "CANCEL ENROLLMENT" IN THE ACTIONS WINDOW.
```

FIG. 28

SPECIFY PULL-DOWN WINDOW WITH "TITLE LINE" CHOSEN

```
ACTIONS  SPECIFY  LAYOUT  EXIT                              F1=HELP

PANEL "ENROLL"              SCREEN 1 OF 1
                            TITLE LINE
   COURS [            ]
   LAST    TITLE. . . . . [_                      ]
   EMPLO
   VM USER ID: [USERID   ]    VM NODE: [NODE     ]
   LOCATION:  [LOC       ]
   TIE/EXT:   [PHONE     ]   (USE DASH TO SEPARATE TIELINE AND EXTENSION)

ENROLLMENT INSTRUCTIONS:
      FILL IN COURSE NO, SECTION, EMPLOYEE SERIAL, VM USER ID AND VM NODE.
      THEN CHOOSE THE "FILL IN EMPLOYEE DATA" IN THE ACTIONS WINDOW.
      TO SUBMIT THE ENROLLMENT, CHOOSE "ENROLL REQUEST" IN THE ACTIONS WINDOW.

CANCELLATION INSTRUCTIONS:
      FILL IN COURSE NO, SECTION AND EMPLOYEE SERIAL.
      THEN CHOOSE THE "FILL IN EMPLOYEE DATA" IN THE ACTIONS WINDOW.
      TO CANCEL THE REQUEST, CHOOSE "CANCEL ENROLLMENT" IN THE ACTIONS WINDOW.
```

ENROLL PANEL DEFINITION WINDOW ON ENTRY TO TITLE LINE POP-UP

FIG. 29

```
ACTIONS  SPECIFY  LAYOUT  EXIT                          | F1=HELP

PANEL "ENROLL"               SCREEN 1 OF 1
                       TITLE LINE
      ┌─────────┐
COURS │         │
LAST   TITLE. . . . . [STUDENT ENROLLMENT APPLICATION      ]
EMPLO
VM USER ID: [USERID  ]    VM NODE: [NODE      ]
LOCATION: [LOC       ]
TIE/EXT: [PHONE      ]  (USE DASH TO SEPARATE TIELINE AND EXTENSION)

ENROLLMENT INSTRUCTIONS:
  FILL IN COURSE NO, SECTION, EMPLOYEE SERIAL, VM USER ID AND VM NODE.
  THEN CHOOSE THE "FILL IN EMPLOYEE DATA" IN THE ACTIONS WINDOW.
  TO SUBMIT THE ENROLLMENT, CHOOSE "ENROLL REQUEST" IN THE ACTIONS WINDOW.

CANCELLATION INSTRUCTIONS:
  FILL IN COURSE NO, SECTION AND EMPLOYEE SERIAL.
  THEN CHOOSE THE "FILL IN EMPLOYEE DATA" IN THE ACTIONS WINDOW.
  TO CANCEL THE REQUEST, CHOOSE "CANCEL ENROLLMENT" IN THE ACTIONS WINDOW.
```

FIG. 30

ENROLL PANEL DEFINITION WINDOW WITH TITLE LINE POP-UP FILLED IN

PANEL DEFINITION WINDOW FOR COURSE_SCHEDULE PANEL

COURSE_SCHEDULE PANEL WITH TABLE SELECTIONS POP-UP FILLED IN

| ACTIONS SPECIFY LAYOUT EXIT | F1=HELP |
|---|---|

PANEL "COURSE_SCHEDULE"  SCREEN 1 OF 1

TABLE FIELDS

| FIELD NAME | TABLE TYPE | COLUMN NAME | USAGE | WIDTH |
|---|---|---|---|---|
| [CRSE   ] | [ROOT] | [COURSE   ] | [S  ] | [ 4] |
| [TITLE  ] | [ROOT] | [TITLE    ] | [S  ] | [40] |
| [CRSE1  ] | [SUB ] | [COURSE   ] | [KAC] | [ 4] |
| [SECT   ] | [SUB ] | [SECTION  ] | [KAC] | [ 4] |
| [SDATE  ] | [SUB ] | [STARTDATE] | [AC ] | [ 8] |
| [EDATE  ] | [SUB ] | [ENDDATE  ] | [AC ] | [ 8] |
| [STIME  ] | [SUB ] | [STARTTIME] | [AC ] | [ 6] |
| [BLDG   ] | [SUB ] | [BLDG     ] | [AC ] | [ 6] |
| [ROOM   ] | [SUB ] | [ROOM     ] | [AC ] | [ 6] |
| [       ] | [    ] | [         ] | [   ] | [  ] |

COURSE_SCHEDULE PANEL WITH TABLE FIELDS POP-UP FILLED IN

FIG. 33

| ACTIONS SPECIFY LAYOUT EXIT | F1=HELP |
|---|---|
| PANEL "COURSE_SCHEDULE" | SCREEN 1 OF 1 |

CONNECTING COLUMNS

| FROM TABLE TYPE | COLUMN NAME | TO TABLE TYPE | COLUMN NAME |
|---|---|---|---|
| [ROOT    ] | [COURSE   ] | [SUB     ] | [COURSE   ] |

FIG. 34

COURSE_SCHEDULE PANEL WITH CONNECTING COLUMNS POP-UP FILLED IN

| ACTIONS SPECIFY LAYOUT EXIT | | | | | | F1=HELP |
|---|---|---|---|---|---|---|
| | PANEL "COURSE_SCHEDULE" | | | | SCREEN 1 OF 1 | |
| COURSE: [CRSE]  TITLE: [TITLE] | | | | | | |
| SECTION NUMBER | START DATE | END DATE | START TIME | BUILDING | ROOM | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |
| [SECT] | [SDATE] | [EDATE] | [STIME] | [BLDG] | [ROOM] | |

PANEL DEFINITION WINDOW FILLED IN FOR COURSE_SCHEDULE PANEL

FIG. 35

ACTIONS  SPECIFY  LAYOUT  EXIT | F1=HELP

PANEL "COURSE_SCHEDULE" SCREEN 1 OF 1

PANEL ACTIONS

| ACTION TEXT | MNEMONIC | ACTION KEY | PANEL OPERATION/COMMAND | MODE |
|---|---|---|---|---|
| [ADD SECTIONS | [A] | [CTRL+F2 | [ADD AND NEXT | [A] |
| [RECALL LAST ENTRY | [R] | [F7 | [PREVIOUS | [A] |
| [UPDATE SECTIONS | [U] | [CTRL+F1 | [CHANGE AND NEXT | [C] |
| [DELETE SECTIONS | [D] | [CTRL+F9 | [DELETE AND NEXT | [C] |
| [NEXT | [N] | [F8 | [NEXT | [C] |
| [SEARCH | [S] | [CTRL+F6 | [SEARCH | [C] |
| [BLANK PANEL | [B] | [SHIFT+F10 | [BLANK PANEL | |
| [PRINT SCHEDULE | [P] | [F9 | [PRINT | |
| [ | [ | [ | [ | |
| [ | [ | [ | [ | |
| [ | [ | [ | [ | |

COURSE_SCHEDULE PANEL WITH PANEL ACTIONS POP-UP FILLED IN

FIG. 36

| ACTIONS SPECIFY LAYOUT EXIT | | | | | F1=HELP |
|---|---|---|---|---|---|
| PANEL "COURSE_SCHEDULE" | | | | SCREEN 1 OF 1 | |
| TITLE LINE | | | | | |
| COURS TITL S TITLE. . . . . [CLASS SCHEDULE  ] | | | | | |
| NUMBER | DATE | DATE | TIME | BUILDING | ROOM |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |
| [SECT] | [SDATE] | [EDATE] | [STIME] | [BLDG] | [ROOM] |

COURSE_SCHEDULE PANEL WITH TITLE LINE POP-UP FILLED IN

FIG. 37

PANEL DEFINITION WINDOW FOR CLASS_INFO PANEL

| ACTIONS SPECIFY LAYOUT EXIT | F1=HELP |
|---|---|
| PANEL "CLASS_INFO" | SCREEN 1 OF 1 |

TABLE SELECTIONS

| TABLE TYPE | TABLE NAME |
|---|---|
| ROOT . . . . . . | [CLASS_SCHEDULE  ] |
| SUB. . . . . . . | [COURSE_CATALOG   ] |
| LOOKUP1. . . . . | [                 ] |
| LOOKUP2. . . . . | [                 ] |
| LOOKUP3. . . . . | [                 ] |
| LOOKUP4. . . . . | [                 ] |
| LOOKUP5. . . . . | [                 ] |
| LOOKUP6. . . . . | [                 ] |
| LOOKUP7. . . . . | [                 ] |
| LOOKUP8. . . . . | [                 ] |
| LOOKUP9. . . . . | [                 ] |

CLASS_INFO PANEL WITH TABLE SELECTIONS POP-UP FILLED IN

FIG. 39

ACTIONS  SPECIFY  LAYOUT  EXIT | F1=HELP

PANEL "CLASS_INFO"  SCREEN 1 OF 1

TABLE FIELDS

| FIELD NAME | TABLE TYPE | COLUMN NAME | USAGE | WIDTH |
|---|---|---|---|---|
| [CRSE    ] | [ROOT   ] | [COURSE   ] | [S] | [ 4] |
| [SECT    ] | [ROOT   ] | [SECTION  ] | [S] | [ 4] |
| [SDATE   ] | [ROOT   ] | [STARTDATE] | [ ] | [ 8] |
| [EDATE   ] | [ROOT   ] | [ENDDATE  ] | [ ] | [ 8] |
| [STIME   ] | [ROOT   ] | [STARTTIME] | [ ] | [ 6] |
| [BLDG    ] | [ROOT   ] | [BLDG     ] | [ ] | [ 6] |
| [ROOM    ] | [ROOT   ] | [ROOM     ] | [ ] | [ 6] |
| [TITLE   ] | [LOOKUP1] | [TITLE    ] | [ ] | [40] |
| [ABSTRACT] | [LOOKUP1] | [ABSTRACT ] | [ ] | [60] |
| [        ] | [       ] | [         ] | [ ] | [  ] |
| [        ] | [       ] | [         ] | [ ] | [  ] |

CLASS_INFO PANEL WITH TABLE FIELDS POP-UP FILLED IN

FIG. 40

| ACTIONS SPECIFY LAYOUT EXIT | F1=HELP |
|---|---|

PANEL "CLASS_INFO"     SCREEN 1 OF 1

CONNECTING COLUMNS

| FROM TABLE TYPE | COLUMN NAME | TO TABLE TYPE | COLUMN NAME |
|---|---|---|---|
| [ROOT ] | [COURSE ] | [LOOKUP1 ] | [COURSE ] |
| [ ] | [ ] | [ ] | [ ] |

CLASS_INFO PANEL WITH CONNECTING COLUMNS POP-UP FILLED IN

FIG. 41

```
ACTIONS  SPECIFY  LAYOUT  EXIT              |  F1=HELP

PANEL "CLASS_INFO"       SCREEN 1 OF 1

COURSE NO.: [CRSE]
   SECTION: [SECT]
     TITLE: [TITLE                              ]

BUILDING: [BLDG  ]
START DATE: [SDATE ]
  END DATE: [EDATE ]
START TIME: [STIME ]
      ROOM: [ROOM  ]

ABSTRACT: [ABSTRACT                                         ]
```

PANEL DEFINITION WINDOW FILLED IN FOR CLASS_INFO PANEL

FIG. 42

| ACTIONS SPECIFY LAYOUT EXIT | | | | F1=HELP |
|---|---|---|---|---|
| | PANEL "CLASS_INFO" | | | SCREEN 1 OF 1 |

PANEL ACTIONS

| ACTION TEXT | MNEMONIC | ACTION KEY | PANEL OPERATION/COMMAND | MODE |
|---|---|---|---|---|
| [SHOW COURSE ABSTRACT] | [S] | [SHIFT+F7] | [SHOW FIELD] | |
| [PRINT CLASS INFO] | [P] | [F9] | [PRINT] | |

CLASS_INFO PANEL WITH PANEL ACTIONS POP-UP FILLED IN

FIG. 43

```
ACTIONS  SPECIFY  LAYOUT  EXIT                              | F1=HELP

PANEL "CLASS_INFO"             SCREEN 1 OF 1

TITLE LINE

COURS                                       ]
   SE
       TITLE. . . . . [CLASS INFORMATION                    ]

BUILDING: [BLDG    ]
   START DATE: [SDATE ]
   END DATE:   [EDATE ]
   START TIME: [STIME ]
   ROOM:     [ROOM ]

ABSTRACT: [ABSTRACT                                      ]
```

CLASS_INFO PANEL WITH TITLE LINE POP-UP FILLED IN

FIG. 44

| EXIT | F1=HELP |
|---|---|
| 03/27/88 | 11:45 |

TECHNICAL EDUCATION MENU

1. EDUCATION CATALOG

> 2. CLASS SCHEDULES

3. ENROLLMENT REQUEST

4. CANCELLATION REQUEST

5. CHECK ENROLLMENT STATUS

MENU FOR EDUCATION APPLICATION, ITEM 2 SELECTED

FIG. 45

MENU ITEM 2 SELECTED WITH RUN PANEL MODE POP-UP OVERLAID

| ACTIONS EXIT | | F1=HELP |
|---|---|---|
| | CLASS SCHEDULE | SCREEN 1 OF 1 |

COURSE: [_  ]
TITLE:  [                    ]

| SECTION NUMBER | START DATE | END DATE | START TIME | BUILDING | ROOM |
|---|---|---|---|---|---|
| _____ | _____ | _____ | _____ | _____ | _____ |
| _____ | _____ | _____ | _____ | _____ | _____ |
| _____ | _____ | _____ | _____ | _____ | _____ |

COURSE_SCHEDULE EXECUTION PANEL READY FOR DATA ROWS TO BE ADDED

FIG. 47

| ACTIONS EXIT | | | | F1=HELP |
|---|---|---|---|---|
| | CLASS SCHEDULE | | SCREEN 1 OF 1 | |

COURSE: [8240]
TITLE: [EFFECTIVE LISTENING      ]

| SECTION NUMBER | START DATE | END DATE | START TIME | BUILDING | ROOM |
|---|---|---|---|---|---|
| [8001] | [06/27/88] | [06/27/88] | [08:00A] | [045] | [3D-55] |
| [8002] | [06/28/88] | [06/28/88] | [08:00A] | [045] | [3D-55] |
| [8003] | [09/13/88] | [09/13/88] | [08:00A] | [045] | [3D-55] |
| [8004] | [09/14/88] | [09/14/88] | [08:00A] | [045] | [3D-55] |
| [8005] | [12/07/88] | [12/07/88] | [08:00A] | [045] | [3D-42] |
| [    ] | [        ] | [        ] | [       ] | [   ] | [     ] |
| [    ] | [        ] | [        ] | [       ] | [   ] | [     ] |

COURSE_SCHEDULE EXECUTION PANEL WITH DATA ROWS FILLED IN

FIG. 48

| ACTIONS EXIT | | | EDULE | | | | F1=HELP |
|---|---|---|---|---|---|---|---|
| > 1. ADD SECTIONS | CTRL+F2 | | | | | SCREEN 1 OF 1 | |
| 2. RECALL LAST ENTRY | F7 | | | | | | |
| 3. BLANK PANEL | SHIFT+F10 | | | | | | |
| 4. PRINT SCHEDULE | F9 | | | | | | |
| | | | | | | | |
| SECTION NUMBER | START DATE | END DATE | | START TIME | BUILDING | ROOM | |
| [8001] | [06/27/88] | [06/27/88] | | [08:00A] | [045] | [3D-55] | |
| [8002] | [06/28/88] | [06/28/88] | | [08:00A] | [045] | [3D-55] | |
| [8003] | [09/13/88] | [09/13/88] | | [08:00A] | [045] | [3D-55] | |
| [8004] | [09/14/88] | [09/14/88] | | [08:00A] | [045] | [3D-55] | |
| [8005] | [12/07/88] | [12/07/88] | | [08:00A] | [045] | [3D-42] | |

COURSE_SCHEDULE EXECUTION PANEL WITH ACTIONS PULL-DOWN OVERLAID

FIG. 49

| ACTIONS EXIT | F1=HELP |
|---|---|
| CLASS SCHEDULE | SCREEN 1 OF 1 |

COURSE: [_  ]
TITLE:  [                    ]

```
┌──────────────────────────────┐
│ DATA ROWS ADDED TO THE DATABASE. │
└──────────────────────────────┘
```

SECTION  
NUMBER     BUILDING    ROOM  
[____]     [____]      [____]  
[____]     [____]      [____]  
[____]     [____]      [____]  
[____]     [____]      [____]  
[____]     [____]      [____]  
[____]     [____]      [____]  
[____]     [____]      [____]  
[____]     [____]      [____]

COURSE_SCHEDULE EXECUTION PANEL WITH DATA ROWS ADDED MESAAGE

FIG. 50

```
ACTIONS  EXIT                                             | F1=HELP

CLASS SCHEDULE             SCREEN 1 OF 1

COURSE:  [_    ]
TITLE:   [              ]

SECTION    START    END     START                         
NUMBER     DATE     DATE    TIME     BUILDING     ROOM

[_____]  [_____] [_____] [_____] [_____]   [_____]

[_____]  [_____] [_____] [_____] [_____]   [_____]
```

COURSE_SCHEDULE EXECUTION PANEL READY TO RUN IN CHANGE MODE

FIG. 51

| ACTIONS EXIT | | | | | F1=HELP |
|---|---|---|---|---|---|

CLASS SCHEDULE                SCREEN 1 OF 1

COURSE: [8240]
TITLE: [_____]

| SECTION NUMBER | START DATE | END DATE | START TIME | BUILDING | ROOM |
|---|---|---|---|---|---|
| _____ | _____ | _____ | _____ | _____ | _____ |
| _____ | _____ | _____ | _____ | _____ | _____ |
| _____ | _____ | _____ | _____ | _____ | _____ |
| _____ | _____ | _____ | _____ | _____ | _____ |

COURSE_SCHEDULE EXECUTION PANEL WITH COURSE NUMBER FILLED IN

FIG. 52

COURSE_SCHEDULE EXECUTION PANEL WITH ACTIONS PULL-DOWN OVERLAID

```
ACTIONS  EXIT                                            | F1=HELP

CLASS SCHEDULE            SCREEN 1 OF 1

COURSE: [8240]
TITLE:  [EFFECTIVE LISTENING          ]

SECTION   START        END          START
NUMBER    DATE         DATE         TIME      BUILDING   ROOM

[8001]    [06/27/88]   [06/27/88]   [08:00A]  [045]      [3D-55]
[8002]    [06/28/88]   [06/28/88]   [08:00A]  [045]      [3D-55]
[8003]    [09/13/88]   [09/13/88]   [08:00A]  [045]      [3D-55]
[8004]    [09/14/88]   [09/14/88]   [08:00A]  [045]      [3D-55]
[8005]    [12/07/88]   [12/07/88]   [08:00A]  [045]      [3D-42]
[    ]    [        ]   [        ]   [      ]  [   ]      [     ]
[    ]    [        ]   [        ]   [      ]  [   ]      [     ]
```

COURSE_SCHEDULE EXECUTION PANEL WITH DATA FROM SEARCH FILLED IN

FIG. 54

| ACTIONS EXIT | | | | | F1=HELP |
|---|---|---|---|---|---|
| | | CLASS SCHEDULE | | SCREEN | 1 OF 1 |

COURSE: [8240]
TITLE: [EFFECTIVE LISTENING              ]

| SECTION NUMBER | START DATE | END DATE | START TIME | BUILDING | ROOM |
|---|---|---|---|---|---|
| [8001] | [06/27/88] | [06/27/88] | [08:00A] | [045] | [3D-55] |
| [8002] | [06/28/88] | [06/28/88] | [08:00A] | [045] | [3D-55] |
| [8003] | [08/19/88] | [08/19/88] | [08:00A] | [045] | [3D-55] |
| [8004] | [10/04/88] | [10/04/88] | [08:00A] | [045] | [3D-55] |
| [8005] | [12/07/88] | [12/07/88] | [08:00A] | [045] | [3D-42] |
| [    ] | [        ] | [        ] | [       ] | [   ] | [     ] |

COURSE_SCHEDULE EXECUTION PANEL WITH DATA FIELDS CHANGED

FIG. 55

| ACTIONS EXIT | | | EDULE | | | F1=HELP |
|---|---|---|---|---|---|---|
| > 1. UPDATE SECTIONS | CTRL+F1 | | | | SCREEN | 1 OF 1 |
| 2. DELETE SECTIONS | CTRL+F9 | | | | | |
| 3. NEXT | F8 | | | | | |
| 4. SEARCH | CTRL+F6 | | | | | |
| 5. BLANK PANEL | SHIFT+F10 | | | | | |
| 6. PRINT SCHEDULE | F9 | | START TIME | BUILDING | ROOM | |
| [8001] | [06/27/88] | [06/27/88] | [08:00A] | [045] | [3D-55] | |
| [8002] | [06/28/88] | [06/28/88] | [08:00A] | [045] | [3D-55] | |
| [8003] | [08/19/88] | [08/19/88] | [08:00A] | [045] | [3D-55] | |
| [8004] | [10/04/88] | [10/04/88] | [08:00A] | [045] | [3D-55] | |
| [8005] | [12/07/88] | [12/07/88] | [08:00A] | [045] | [3D-42] | |
| [    ] | [        ] | [        ] | [       ] | [   ] | [    ] | |
| [    ] | [        ] | [        ] | [       ] | [   ] | [    ] | |
| [    ] | [        ] | [        ] | [       ] | [   ] | [    ] | |

COURSE_SCHEDULE EXECUTION PANEL WITH ACTIONS PULL-DOWN OVERLAID

FIG. 56

| ACTIONS EXIT | F1=HELP |
|---|---|
| CLASS SCHEDULE | SCREEN 1 OF 1 |

COURSE: [_ ]
TITLE: [ ]

```
┌─────────────────────────────────┐
│ DATA ROWS UPDATED IN THE DATABASE. │
└─────────────────────────────────┘
```

| SECTION NUMBER | | BUILDING | | ROOM | |
|---|---|---|---|---|---|

COURSE_SCHEDULE EXECUTION PANEL WITH DATA ROWS UPDATED MESAAGE

FIG. 57

```
EXIT                                              F1=HELP

03/27/88                                          11:45

TECHNICAL EDUCATION MENU

1. EDUCATION CATALOG

2. CLASS SCHEDULES

> 3. ENROLLMENT REQUEST

4. CANCELLATION REQUEST

5. CHECK ENROLLMENT STATUS
```

MENU FOR EDUCATION APPLICATION, ITEM 3 SELECTED

FIG. 58

```
ACTIONS  EXIT                                                    | F1=HELP

STUDENT ENROLLMENT APPLICATION        SCREEN 1 OF 1

COURSE NO.: [_]            SECTION: [    ]

LAST NAME: [         ] FIRST: [        ] MI: [ ]
EMPLOYEE SERIAL: [     ] DEPT: [    ] ZIP: [    ] DIV: [  ]
VM USER ID: [        ] VM NODE: [    ]
LOCATION: [        ]
TIE/EXT: [         ] (USE DASH TO SEPARATE TIELINE AND EXTENSION)

ENROLLMENT INSTRUCTIONS:
 FILL IN COURSE NO, SECTION, EMPLOYEE SERIAL, VM USER ID AND VM NODE.
 THEN CHOOSE THE "FILL IN EMPLOYEE DATA" IN THE ACTIONS WINDOW.
 TO SUBMIT THE ENROLLMENT, CHOOSE "ENROLL REQUEST" IN THE ACTIONS WINDOW.

CANCELLATION INSTRUCTIONS:
 FILL IN COURSE NO, SECTION AND EMPLOYEE SERIAL.
 THEN CHOOSE THE "FILL IN EMPLOYEE DATA" IN THE ACTIONS WINDOW.
 TO CANCEL THE REQUEST, CHOOSE "CANCEL ENROLLMENT" IN THE ACTIONS WINDOW.
```

ENROLL PANEL READY TO RUN IN ADD MODE

FIG. 59

```
ACTIONS  EXIT                                                    F1=HELP

STUDENT ENROLLMENT APPLICATION         SCREEN  1 OF 1

COURSE NO.: [8240]       SECTION: [8002]

LAST NAME: [        ] FIRST: [        ] MI: [ ]
EMPLOYEE SERIAL: [295017] DEPT: [    ] ZIP: [    ] DIV: [ ]
VM USER ID: [WATSON    ] VM NODE: [AUSVM1  ]
LOCATION: [        ]
TIE/EXT: [        ] (USE DASH TO SEPARATE TIELINE AND EXTENSION)

ENROLLMENT INSTRUCTIONS:
  FILL IN COURSE NO, SECTION, EMPLOYEE SERIAL, VM USER ID AND VM NODE.
  THEN CHOOSE THE "FILL IN EMPLOYEE DATA" IN THE ACTIONS WINDOW.
  TO SUBMIT THE ENROLLMENT, CHOOSE "ENROLL REQUEST" IN THE ACTIONS WINDOW.

CANCELLATION INSTRUCTIONS:
  FILL IN COURSE NO, SECTION AND EMPLOYEE SERIAL.
  THEN CHOOSE THE "FILL IN EMPLOYEE DATA" IN THE ACTIONS WINDOW.
  TO CANCEL THE REQUEST, CHOOSE "CANCEL ENROLLMENT" IN THE ACTIONS WINDOW.

ENROLL PANEL FILLED IN
```

FIG. 60

```
ACTIONS  EXIT                                    ]   F1=HELP

PLICATION       SCREEN  1 OF 1
 1. ENROLL REQUEST     CTRL+F2
 2. CHECK CLASS INFO   CTRL+F10   002]
>3. FILL IN EMPLOYEE DATA SHIFT+F9
 4. PRINT REQUEST      F9
 5. RECALL LAST ENTRY  F7                MI: [ ]
 6. BLANK PANEL        SHIFT+F10
                                 ZIP: [       ]   DIV: [     ]

LOCATION: [         ]
TIE/EXT:  [       ]    (USE DASH TO SEPARATE TIELINE AND EXTENSION)

ENROLLMENT INSTRUCTIONS:
FILL IN COURSE NO, SECTION, EMPLOYEE SERIAL, VM USER ID AND VM NODE.
THEN CHOOSE THE "FILL IN EMPLOYEE DATA" IN THE ACTIONS WINDOW.
TO SUBMIT THE ENROLLMENT, CHOOSE "ENROLL REQUEST" IN THE ACTIONS WINDOW.

CANCELLATION INSTRUCTIONS:
FILL IN COURSE NO, SECTION AND EMPLOYEE SERIAL.
THEN CHOOSE THE "FILL IN EMPLOYEE DATA" IN THE ACTIONS WINDOW.
TO CANCEL THE REQUEST, CHOOSE "CANCEL ENROLLMENT" IN THE ACTIONS WINDOW.
```

ENROLL PANEL WITH ACTIONS PULL-DOWN OVERLAID

FIG. 61

```
ACTIONS  EXIT                                              | F1=HELP

STUDENT ENROLLMENT APPLICATION        SCREEN 1 OF 1

COURSE NO.: [8240]       SECTION: [8002]

LAST NAME: [WATSON          ] FIRST: [SUSAN     ] MI: [L]
EMPLOYEE SERIAL: [295017]  DEPT: [A5A]  ZIP: [814 ]  DIV: [44 ]
VM USER ID: [WATSON  ]  VM NODE: [AUSVM1  ]
LOCATION: [AUSTIN          ]
TIE/EXT: [793-3300]  (USE DASH TO SEPARATE TIELINE AND EXTENSION)

ENROLLMENT INSTRUCTIONS:
  FILL IN COURSE NO, SECTION, EMPLOYEE SERIAL, VM USER ID AND VM NODE.
  THEN CHOOSE THE "FILL IN EMPLOYEE DATA" IN THE ACTIONS WINDOW.
  TO SUBMIT THE ENROLLMENT, CHOOSE "ENROLL REQUEST" IN THE ACTIONS WINDOW.

CANCELLATION INSTRUCTIONS:
  FILL IN COURSE NO, SECTION AND EMPLOYEE SERIAL.
  THEN CHOOSE THE "FILL IN EMPLOYEE DATA" IN THE ACTIONS WINDOW.
  TO CANCEL THE REQUEST, CHOOSE "CANCEL ENROLLMENT" IN THE ACTIONS WINDOW.
```

ENROLL PANEL AFTER COMPUTE ACTION FILLED IN LOOKUP TABLE FIELDS

FIG. 62

```
ACTIONS  EXIT                                      |     F1=HELP

1. ENROLL REQUEST           CTRL+F2     PLICATION     SCREEN 1 OF 1
> 2. CHECK CLASS INFO         CTRL+F10
  3. FILL IN EMPLOYEE DATA    SHIFT+F9    002]
  4. PRINT REQUEST             F9
  5. RECALL LAST ENTRY         F7                 ] MI: [L]      DIV: [44 ]
  6. BLANK PANEL              SHIFT+F10            ZIP: [814]
                                                         ]

LOCATION: [AUSTIN           ]
TIE/EXT:  [793-3300]   (USE DASH TO SEPARATE TIELINE AND EXTENSION)

ENROLLMENT INSTRUCTIONS:
FILL IN COURSE NO, SECTION, EMPLOYEE SERIAL, VM USER ID AND VM NODE.
THEN CHOOSE THE "FILL IN EMPLOYEE DATA" IN THE ACTIONS WINDOW.
TO SUBMIT THE ENROLLMENT, CHOOSE "ENROLL REQUEST" IN THE ACTIONS WINDOW.

CANCELLATION INSTRUCTIONS:
FILL IN COURSE NO, SECTION AND EMPLOYEE SERIAL.
THEN CHOOSE THE "FILL IN EMPLOYEE DATA" IN THE ACTIONS WINDOW.
TO CANCEL THE REQUEST, CHOOSE "CANCEL ENROLLMENT" IN THE ACTIONS WINDOW.
```

FIG. 63

ENROLL PANEL WITH "CHECK CLASS INFO" ACTION CHOSEN

```
ACTIONS  EXIT                                      | F1=HELP

CLASS INFORMATION           SCREEN 1 OF 1

COURSE NO.: [8240]
   SECTION: [8002]
     TITLE: [EFFECTIVE LISTENING        ]

BUILDING: [045  ]
START DATE: [06/28/88]
  END DATE: [06/28/88]
START TIME: [08:00A]
      ROOM: [3D-55 ]

ABSTRACT: [EFFECTIVE LISTENING COURSE IS DESIGNED TO IMPROVE THE LISTE]
```

CLASS_INFO PANEL WITH DATA FIELDS DISPLAYED

FIG. 64

```
ACTIONS  EXIT                              |                    | F1=HELP

> 1. SHOW COURSE ABSTRACT    SHIFT+F7    ON        SCREEN 1 OF 1
  2. PRINT CLASS INFO        F9

SECTION: [8002]
    TITLE: [EFFECTIVE LISTENING                        ]

BUILDING: [045   ]
START DATE: [06/28/88]
  END DATE: [06/28/88]
START TIME: [08:00A]
      ROOM: [3D-55 ]

ABSTRACT: [EFFECTIVE LISTENING COURSE IS DESIGNED TO IMPROVE THE LISTE]
```

CLASS_INFO PANEL WITH ACTIONS PULL-DOWN OVERLAID

FIG. 65

```
| ACTIONS  EXIT                              | F1=HELP

STUDENT ENROLLMENT APPLICATION          SCREEN 1 OF 1

COURSE NO.: [8240]            SECTION: [8002]

LAST NAME: [WATSON          ] FIRST: [SUSAN    ] MI: [L]
EMPLOYEE SERIAL: [295017] DEPT: [A5A] ZIP: [814]    DIV: [44 ]
VM USER ID: [WATSON  ]    VM NODE: [AUSVM1  ]
LOCATION: [AUSTIN  ]
TIE/EXT: [793-3300]  (USE DASH TO SEPARATE TIELINE AND EXTENSION)

ENROLLMENT INSTRUCTIONS:
  FILL IN COURSE NO, SECTION, EMPLOYEE SERIAL, VM USER ID AND VM NODE.
  THEN CHOOSE THE "FILL IN EMPLOYEE DATA" IN THE ACTIONS WINDOW.
  TO SUBMIT THE ENROLLMENT, CHOOSE "ENROLL REQUEST" IN THE ACTIONS WINDOW.

CANCELLATION INSTRUCTIONS:
  FILL IN COURSE NO, SECTION AND EMPLOYEE SERIAL.
  THEN CHOOSE THE "FILL IN EMPLOYEE DATA" IN THE ACTIONS WINDOW.
  TO CANCEL THE REQUEST, CHOOSE "CANCEL ENROLLMENT" IN THE ACTIONS WINDOW.
```

ENROLL PANEL WITH DATA FIELDS FILLED IN

FIG. 66

```
ACTIONS  EXIT                                              | F1=HELP

STUDENT ENROLLMENT APPLICATION      SCREEN 1 OF 1

COURSE NO.: [_]        SECTION: [   ]
LAST NAME: [                          : [ ]       DIV: [ ]
EMPLOYEE SER  | DATA ROWS ADDED TO THE DATABASE.
VM USER ID:   |
LOCATION: [
TIE/EXT: [      ]  (USE DASH TO SEPARATE TIELINE AND EXTENSION)

ENROLLMENT INSTRUCTIONS:
   FILL IN COURSE NO, SECTION, EMPLOYEE SERIAL, VM USER ID AND VM NODE.
   THEN CHOOSE THE "FILL IN EMPLOYEE DATA" IN THE ACTIONS WINDOW.
   TO SUBMIT THE ENROLLMENT, CHOOSE "ENROLL REQUEST" IN THE ACTIONS WINDOW.

CANCELLATION INSTRUCTIONS:
   FILL IN COURSE NO, SECTION AND EMPLOYEE SERIAL.
   THEN CHOOSE THE "FILL IN EMPLOYEE DATA" IN THE ACTIONS WINDOW.
   TO CANCEL THE REQUEST, CHOOSE "CANCEL ENROLLMENT" IN THE ACTIONS WINDOW.
```

ENROLL PANEL WITH DATA ROWS ADDED MESSAGE

FIG. 67

SYSTEM FOR INTERACTIVELY CREATING ACTION BAR PULL-DOWN WINDOWS OF A USER INTERFACE FOR USE AT PROGRAM RUN TIME

BACKGROUND ART

This invention relates to user interfaces adapted for use with information processing systems, and, more particularly, relates to systems and methods for generating customized screens for interfacing with said systems.

With the widespread adoption and use of computerized information processing systems has come a correspondingly large and diverse number of application program software for satisfying the needs of various users of such systems. However, notwithstanding such an increase in the variety and availability of excellent application software, due to such diverse needs, which can often times becomes quite specialized, a need arose for software products which could be readily adapted and customized by the end users as required to suit their particular environment and application.

As but one simple example, it has become quite conventional to allow for the custom configuring of various software products by the user through menu driven system configuration options at the front end of the application programs. A typical example of this may be seen in the communication software support programs for modems such as the products commercially offered by Hayes Microcomputer Products, Inc. In such a product, for example, in the initial boot up of the system it is commonplace to encounter a "Change System Configuration" menu whereby through user interaction, a system may be easily reconfigured and adapted for various printer interface cards, options specifying whether line feeds are needed, number of disk drives used, expansion slot number wherein the printer interface card resides, ability to specify various baud rates, and the like.

While such systems did provide for limited adaptability and customizing of software to the particular needs of the end user, they nevertheless still suffered from an inherent disadvantage. The variations and ways in which an end user could interface with the software product to specify these variations were themselves, predetermined by the software programmer, and thus relatively fixed in the product. This limitation, -in turn, gave rise to the emergence of various software products which could give the end users themselves some control over tailor making or customizing the user interface to the functions of the application program. Thus, it became highly desirable to provide end users with the additional capability of making adjustments for the software to their particular application.

For example, in the field of relational database systems, heretofore the end user of such systems was stuck with the content and manner of interaction of the user with various pull-down or pop-up windows in the interface for interacting with the database. More particularly, end users had no control over the variety and the manners of ways items could be selected from a window, the way such action items were described (such as "print customer order", "search invoices", etc.) they simply had to rely on the application designer's knowledge of their particular business and needs in attempting to provide an application program of maximum utility to an ever-growing number of end users with widely divergent requirements. The invention addresses the problem of mutually inconsistent goals in designing an application for a potentially large installed base while at the same time taking into account the need of end users not skilled in programming to customize features in a simple, efficient way.

Continuing with the relational database system example, with the advent of this need for end user customization, techniques became available for affording various degrees of such customization of screens for data viewing and entry. Examples of such products in the relational database art providing for various degrees of user interface customization include the following products followed immediately by their respective commercial sources: PC/FOCUS, Information Builders, Inc.; Paradox, ANSA Software; dBaseIII+, Ashton-Tate; and Oracle, Oracle Corporation.

Notwithstanding the aforementioned increased availability of products with end user customization capability, a serious problem nevertheless still remained. Very typically at some point in the customization steps in the software, programming knowledge and skills were required to complete the software customization, including detailed knowledge of programming language syntax and semantics, and the like. It should be readily apparent that this requirement was inconsistent with the capabilities of many end users and the need to provide for versatile user interface customizing by an end user with neither the time, money nor inclination to bring programming skills to bear in order to enjoy the benefits of such customization. In other words, complete customization has generally required programming expertise in generation of applications using program language statements.

Moreover the run time user of the application, who is often times different from the user interface designer in the past, knows the application's interaction techniques including such things as application action bars and action pull-down windows. It was thus also highly desirable to provide a tool to a run time user for design and modification of a user interface (including panel action/operations) in a format and using interaction techniques already familiar to the user through running the application. In this manner, the user would be less intimidated by the custom design and modification process as well as the interface panels and the like themselves and thus could become productive sooner.

With the foregoing in mind, it would be highly desirable to provide for end user design of panels for example to create customized screens for data viewing and entry which might be manipulated by the end users in the same way that they interact with other portions of the product such as the familiar application action bar. Still further, the desired product would permit the panel designer to fully customize an action pull-down window which would appear on the application action bar when running panels. It would also be highly desirable to provide for a system and method for user interface definition wherein the panel designer could create the application by specifying a series of panels and menus created essentially by filling in pop-up windows customized, and wherein such creation is in an interactive session with the interface but without the heretofore noted drawback of required specific programming skills. It would further be highly desirable to provide such techniques for user interface definition wherein the panel actions feature provided a panel designer with the means to assign at will not only the text of action items with which the user would select functions but the manner in which this was accomplished by way of varying mnemonics, function keys to each action, and the like. These and other novel features of the present invention are hereinafter described in greater detail.

SUMMARY OF THE INVENTION

A user interface with system and method for specifying same. During a panel definition phase, a panel actions pop-up window is displayed with a plurality of prompts for specifying the form, content and function of a subsequent pull down window which becomes part of a panel interface to a specified application program which is available to the run time user by interaction with an application action bar. In a preferred embodiment, the panel action-defining or first window, for use in creating a customized panel, includes as prompts a plurality of columns captioned Action text, Mnemonic, Action key, Panel operation/command, and Mode with a set of default actions displayed for each such column. The panel designer may use the presented defaults, may change or delete any or all of them, and may add new ones as the application requires.

The panel actions are used during panel execution to manipulate the panel, and are based upon a set of panel operations and/or commands whereby the user may combine operations and commands to tailor the set of actions for a desired panel. The panel designer in accordance with the invention will select which panel operations will be available to the panel and the user during execution by means of interaction with this first window. If a default definition option is selected for panel definition, the panel end user is provided in the first window with a pre-defined set of panel actions which may be selected from and customized as desired. Alternatively, the designer may input other panel actions. With respect to each panel action specified in the first window, an Add or Change mode of operation may be associated therewith and also specified in the first window.

During the run time mode of execution, the user may specify whether the Add or Change mode of execution is desired or it may be automatically pre-specified as a function of a particular panel to be run. In either event, second panel action windows may then be displayed whose content will be a function of the particular panel being selected for execution, the content selected or specified by means of the first window, and the mode of execution specified. One set of available panel actions will thus be displayed in one of the second panel actions display windows corresponding to panel actions in the first window designated by the "Mode" prompt as being an Add-type action. A second set of panel actions will be displayed in an alternate second panel action design window corresponding to panel actions in the first window designated by the "Mode" prompt as being Change-type actions.

Valid panel operations only if an "Add data rows" operation has been pre-specified in the first window prior to display of a second window include "Add and next" and "Previous". Valid panel operations only if "Change data rows" has been pre-specified prior to display of a second display window include Reset, Print All, Next, Change, Change and Next, Search, Extended Search and Delete and Next.

In lieu of an Add or Change panel operation, the panel designer may specify a command which is used to execute other objects in the application program which can be previously specified and saved by the designer, an example of which is a command to run a database query object. With respect to each aforementioned column caption or prompt in the definition window for prompting user input to define and design the panel, their use is as follows. First, in the panel operation/command column one or more such operations or commands are entered in the column from the pre-selected default list or otherwise. For each such operation or command entered, a panel designer inserts an indicator in a corresponding location in the Mode column or accepts a displayed default mode "Add data" or "Change data" corresponding to the type of operation or command. Also in the first display window, the panel designer provides in the action key and mnemonic columns corresponding indicators of action keys or mnemonic devices, respectively, desired for use with the second window in selecting panel operations or commands displayed therein for execution during application run time. Finally, in the "Action text" prompt for entries into that column, the designer may input text corresponding to and for use in selecting a particular panel operation/command, with such text appearing in the second windows and preferably employing terminology more familiar to the end user of the panel. When the designer has thereby completed the panel definition, the panel is saved as a panel object in the database. The application then converts the information just input from the panel actions definition windows into two dynamic pull-down window formats, one for add data rows mode and one for change data rows mode, and also saves them as part of the panel object.

The panel actions feature of the invention provides the panel designer with means to assign mnemonics and function keys to each action. The mnemonic is a character in the action text that is highlighted in the resultant second pull-down windows and can be used to select the action by the run time user. The function key is displayed in the resultant pull-down window. The run time user views the function key assignment when the customized pull-down window is displayed. The function key is active outside of the pull-down window and can be activated to invoke the action to which it is correlative and visually associated in the pull-down window as a fast path to selecting action from the pull-down window. The order of actions in the pull-down window is determined by the order specified by the panel designer when the panel is defined. The action text is variable to the panel designer who can specify text corresponding to application program actions which is oriented to the run time user and thereby can contain special terms or be in the user's national language.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

FIGS. 1-7 are illustrations of a screen sequence generated in accordance with the invention in defining panel actions windows.

FIGS. 13-30 are illustrations of a screen sequence generated in accordance with the invention in an example to define an ENROLL panel including panel actions windows.

FIGS. 31-37 are illustrations of a screen sequence generated in accordance with the invention in an example to define a COURSE SCHEDULE including panel actions windows.

FIGS 38-44 are illustrations of a screen sequence generated in accordance with the invention in an example to define a CLASS INFORMATION panel including panel actions windows.

FIGS. 45-50 are illustrations of a screen sequence generated in accordance with the invention for running the COURSE SCHEDULE panel in an example for adding and defining course information.

FIGS. 51-54 are illustrations of a screen sequence generated in accordance with the invention for running the COURSE SCHEDULE panel in an example for updating, searching and changing the COURSE SCHEDULE.

FIGS. 58-62 are illustrations of a screen sequence generated in accordance with the invention for running the ENROLL panel in an example including a computed fill-in command specified as a panel action in defining panel action windows for the ENROLL panel.

FIGS. 63-67 are illustrations of a screen sequence generated in accordance with the invention for running the CLASS INFORMATION panel in an example including a Run Class Information automatic command specified in defining panel action windows for the CLASS INFORMATION panel.

BEST MODE FOR CARRYING OUT THE INVENTION

Panel Definition

Figures 10, 12:
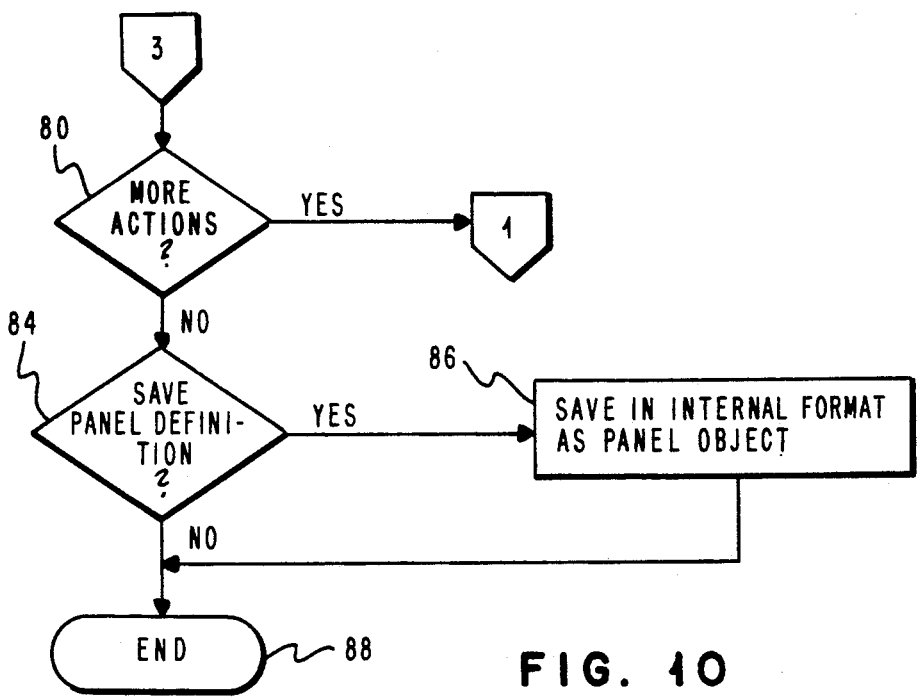
FIG. 12 is an illustration of the structure of tables in a database used in an example to illustrate operation and features of the invention.
Figure 11:
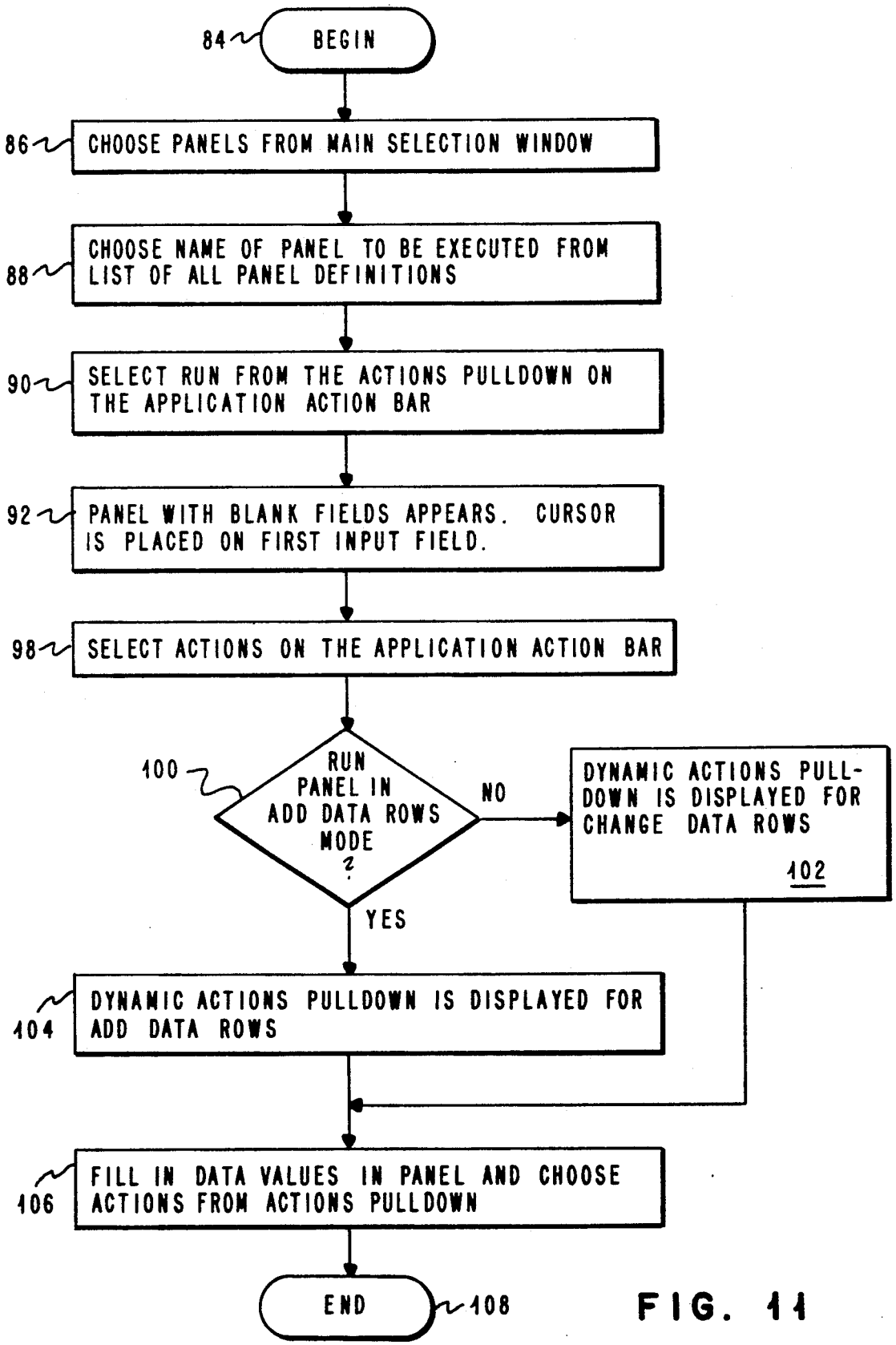
FIG. 11 is a flow diagram of a computerized process for execution of panels in an application program wherein panel action windows of the invention are desired to appear.

In order to provide a clear understand of the subject invention, first a generalized sequence of screens will be discussed generated in accordance therewith with reference to FIGS. 1-7. This will then be followed by a discussion of a flow diagram with reference to FIGS. 8-10 for defining panels and panel action windows. Next, FIG. 11 will be discussed to provide a clearer understanding of the use of the panel and panel action pull-down windows generated by the invention in accordance with the process depicted in FIGS. 8-10 during panel execution. With reference to FIGS. 12-67, several actual examples of screen sequences will be discussed with reference to specific examples wherein panels and panel action window pop-ups are defined in accordance with the invention and used during various panel executions. Finally a functional block diagram of the system will be discussed referencing FIG. 68.

Referring first to FIGS. 1-7, a very brief overall discussion of the sequence of specifying panel action windows in the manner of the invention will be given. In accordance with the invention, in FIG. 8 a computerized process will be initiated at 10 whereupon desired actions required for a given panel to be defined will be specified, 12. This is followed by selecting (means of a cursor, user input of the numeral 4, mouse, or the like) of the "panel actions", 14, of FIG. 1 (corresponding to step 16 of FIG. 8 in the panel definition flow diagram).

Figure 8:
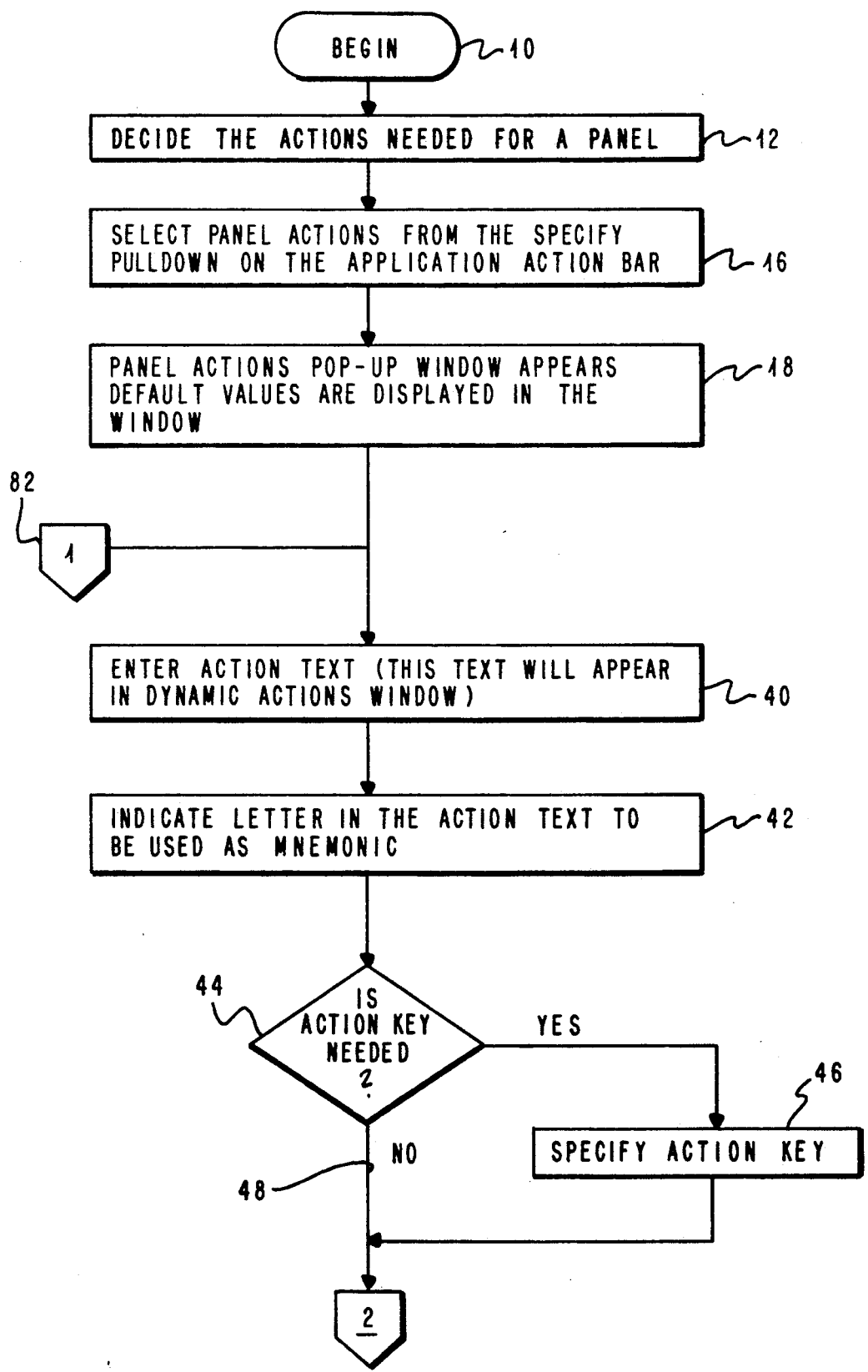
FIGS. 8-10 are flow diagrams of a computerized process for defining panel action windows in the manner of the invention and generating the screen sequence of FIGS. 1-7.

This action results in appearance of a panel action's pop-up window with default values as shown in FIG. 2 and indicated at step 18 of FIG. 8.

Several things may be noted by this first appearance of the panel action's pop-up window 20 which overlays a preexisting panel definition window 22. It will be noted that the "Specify" pull-down window depicted in FIG. 1 was itself called to the screen by selecting the "Specify" selection in the application action bar 24 (by any means well known in the art such as a mouse, cursor, etc.). Continuing with FIG. 2, the title 24 for the panel preferably appears in the underlying window. In the preferred embodiment immediately at the appearance of the FIG. 2 screen the panel designer is presented with a set of default actions defined with prompts for action text 26, mnemonics 28, action keys 30, panel operations/commands 32 and modes 34.

It is contemplated by the invention to enable the panel designer to have a plurality of ways to activate operation of panel actions by interacting with a subsequent panel actions pull-down. These include keying in a mnemonic letter highlighted in action text or selecting an action key associated with the desired operation as displayed in the pull-down window. Prompts such as 28 and 30 (FIG. 2) for prompting the user to specify in the panel design window the actions to be used in the pull-down for selecting a corresponding operation will be collectively known as panel action specifier prompts. The means of selection (keyed mnemonic, action key, etc.) are generally the panel action specifiers. Although only mnemonic and action key specifiers are shown in the embodiment of FIG. 2 as designer selectable, the invention admits of any number and type of such specifiers as desired and is not intended to be limited to mnemonics or action keys.

Under each such prompt 26–34 previously listed appears a column of correlative suggested defaults. The panel designer may use the defaults presented, may change or delete any or all of them, and may add new ones. Action text under the action text prompt 26 preferably will be selected in terminology familiar with the end user of the panel. Mnemonics under the mnemonic prompt 28 will be selected which in one embodiment is a letter appearing in the action text. On the display, the intensity of this letter will be highlighted where it appears in the action text in the panel actions pop-up window being customized when the pop-up window later appears in use in the product. Action keys are suggested in the default window under the action key prompt 30 so as to be consistent with action keys in other parts of the product, but may be changed as needed during the panel design process presently under discussion.

With reference to panel operation/command prompt 32, items shown thereunder are herein referred to as panel actions which are used during panel execution to manipulate the panel. They are based on a set of panel operations and/or commands relating to the database. The user can command the operations and commands to tailor the set of actions for the panel. In other words, the panel designer will choose what panel operations will be available to the panel end user during execution. As shown in FIG. 2 if the default definition option is chosen for panel definition, the panel end user is given a pre-defined set of panel actions depicted therein which can be customized if desired.

The particular "Actions" pop-down window presently being defined which appears later during panel execution depends on which mode of execution is chosen (i.e., Add or Change). Panel operations are defined in terms of panel instances and panel set. The validity of each panel operation and in some situations the manner of execution is determined by the run time mode of execution as aforesaid (Add or Change). Examples of valid operations for both execution options will be hereinafter listed followed by operations valid only for each mode of execution:

Valid Panel Operations for Both Add and Change

Print—Prints the current panel instance
Blank panel—Presents a panel instance with all data and computed fields null
Show field—Displays a pop-up window where the user may completely display and/or Change or Add data to the field which has been specified as being longer than the available space on the panel
Compute—Causes computed fields to be calculated and displayed on a current panel instance.

Valid Panel Operations Only for "Add Data Rows"

Add and Next—Performs an addition to the database to add the row or repeated rows specified on the panel.
Previous—Presents the previous panel instance that was just added. After executing the "Add and Next" action, a blank panel is automatically presented to the end user for more additions.

Valid Panel Operations Only for "Change Data Rows"

Reset—Returns the current panel instance to its condition at the time of the last database action.
Print All—Prints all the panel instances in the panel set.
Next—Presents the next panel instance in the panel set.
Change—Performs a change to any of the input data fields changed by the user in the displayed panel instance.
Change and Next—Performs an update to the database to update the rows changed on this panel instance.
Search—Presents the first panel instance in the panel set which satisfies a search condition as determined by the data values input by the panel end user on the panel.
Extended Search—Pop-up window is presented allowing more knowledgeable end users to specify more extensive search conditions.
Delete and Next—If screen cursor is positioned on a repeated row, this action applies only to that row and that row alone will be deleted from the database. If the cursor is not on a repeated row, the row in the root table represented on the current panel instance will be deleted.

In addition to the panel operations just described such as those indicated at reference numeral 36 (i.e., the preset instructions that are defined by the particular application), a designer may specify a command in the prompt 32 column in place of an operation. Commands are used to execute other objects in the application which can be created and saved by the designer. An example of a command is a Run Query "query name" where "query name" is the name of a query object created by the designer. The query may request certain data be retrieved from the database and formatted as a report. An alternate example of a command which may be selected from the default list in FIG. 2 or otherwise specified and inserted by the designer is the compute command 38 which will cause computed fields to be effected if this panel action is selected in the panel action- pop-up window presently being defined.

Returning to FIG. 8 it will be noted that step 40 corresponds in the flow diagram to entering the desired action text in the column 26. Step 42 corresponds to entering the desired letter mnemonic in column 28. If an action key is also desired for providing the user an additional manner for selecting action text in a subsequent panel action pop-up window, either the default listed action keys in the column are specified, 46, (by a device such as a cursor or mouse), or, if no such key is desired, the process exits at 42.

Figure 1:
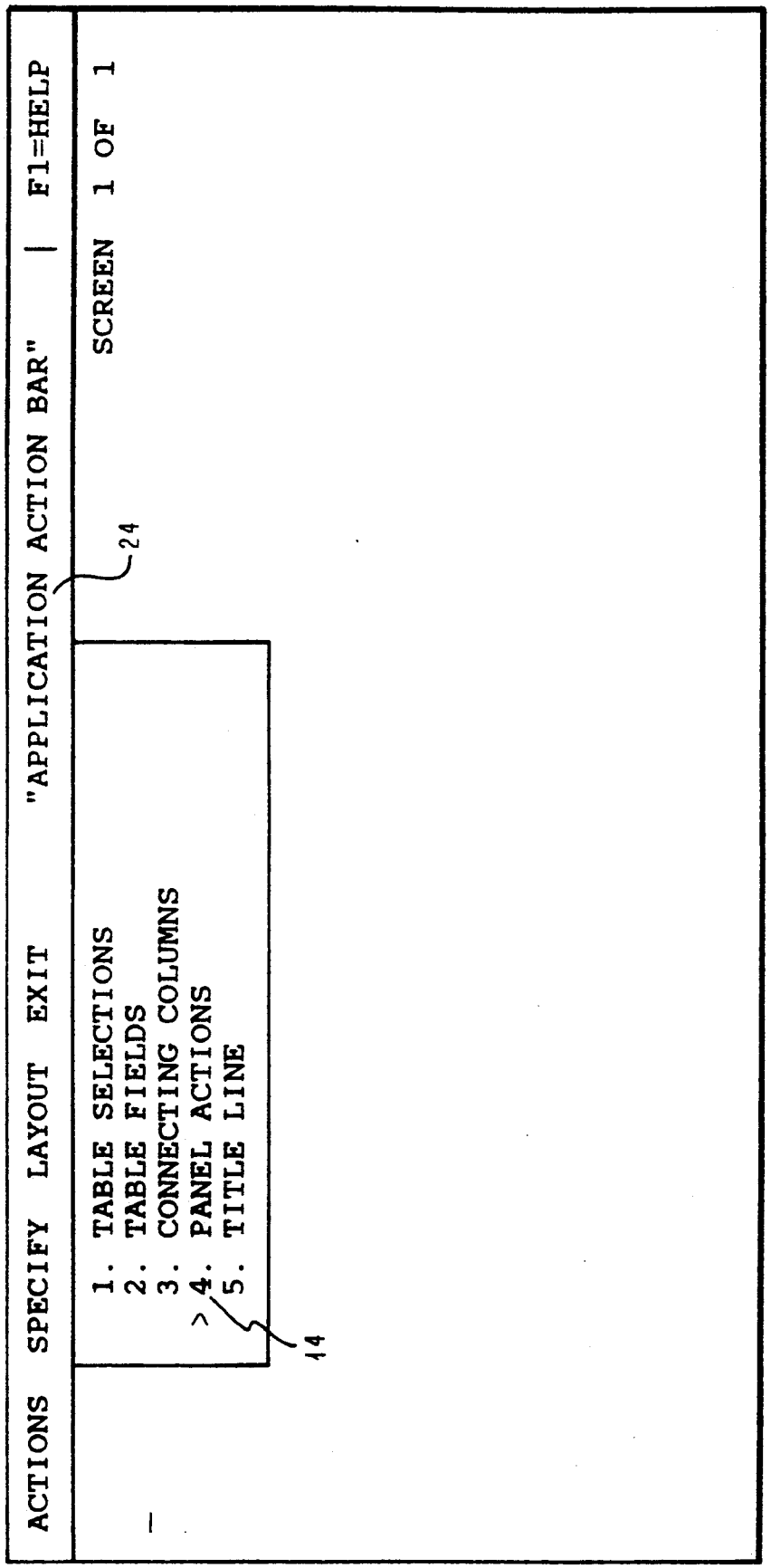
Figure 3:
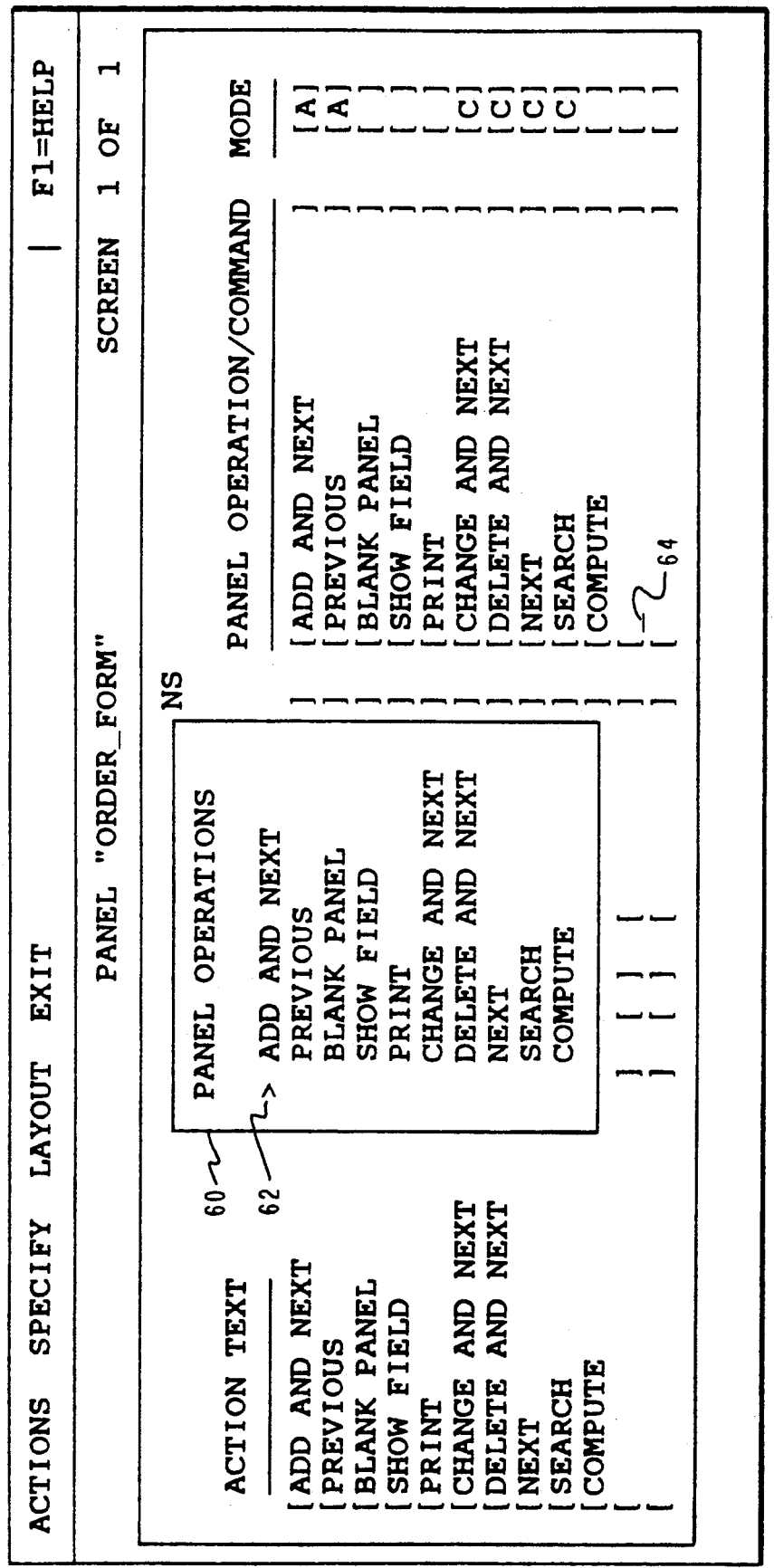
Figure 9:
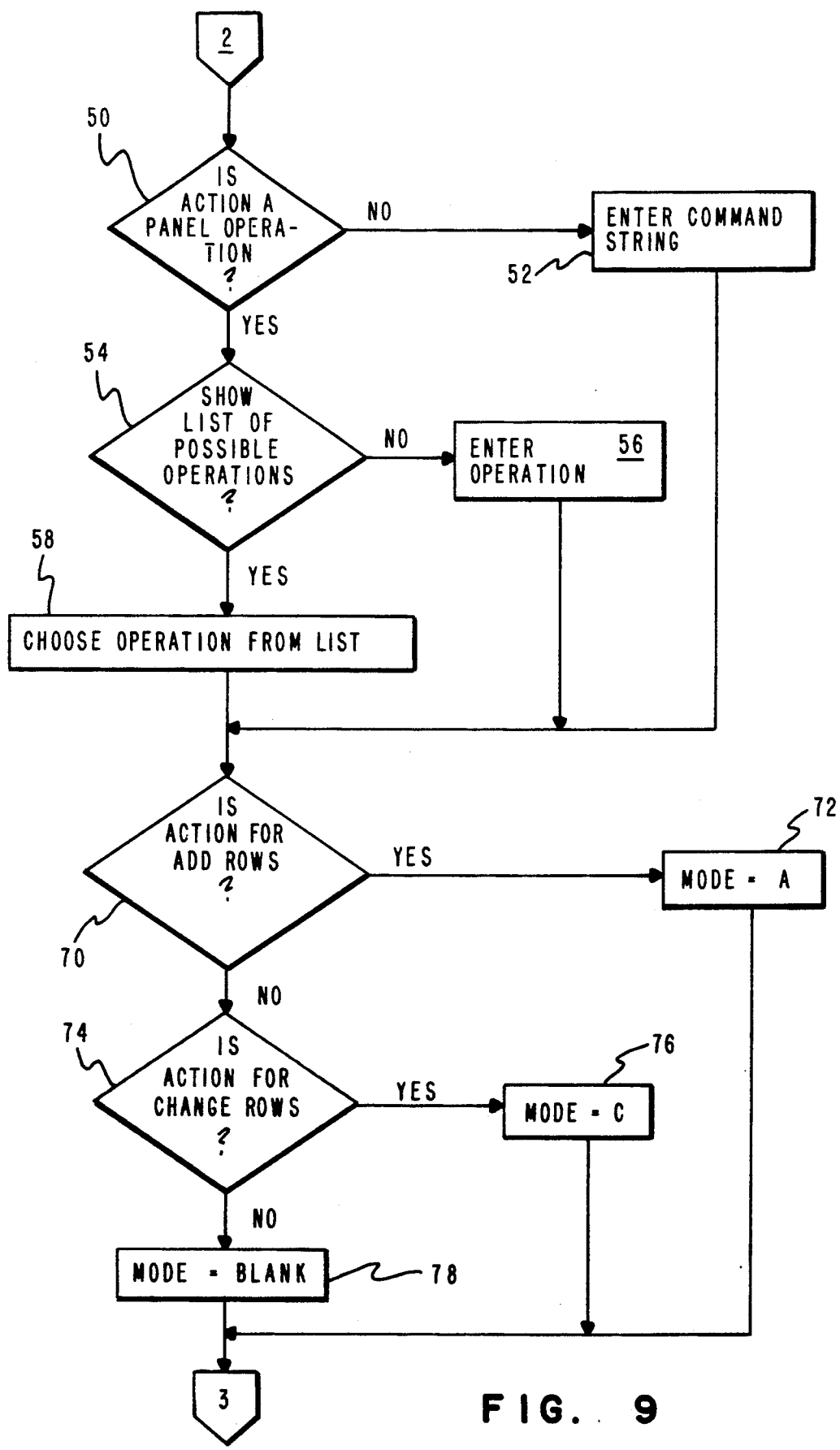

Continuing with FIG. 9, if the panel action currently being specified in the column 32 of FIG. 2 is not a panel operation, i.e., it is a command, any desired command string is entered as shown at step 52 (such as a query in the particular query language of the application program which may be a prompted query, SQL statement well known in the art, or the like). If on the other hand, a panel operation is desired as shown by the Yes path out of block 50, the process will check whether a prompt list is desired by the user listing all possible operations of the system as shown at block 54. If no list is desired, the user inputs a selected operation, 56. However, if an operations list is desired, it is displayed and the operator chooses a desired operation from the list, 58. With reference to FIG. 3, the panel actions pop-up window currently being designed is shown with such a panel operations list window 60 displayed. The panel designer could request such a list of all available panel operations by pressing a function key such as F4=List key. A cursor 62 may then be placed in the field for a panel operation. When the designer selects an operation from the displayed list, the list window is removed and the selected operation is inserted in the field where the cursor 64 is present in the last panel operation field. It will be evident that since the panel actions pop-up 20 is initially displayed with defaults including panel operations filled in, the designer would not typically use the operations list 60 function at this point. After changes are made to the panel actions such as deleting some panel actions, however, it is generally found more useful to use the List function to show all possible panel operations.

Referring back to FIG. 2, it will be recalled that a mode prompt 34 is provided and that valid panel operations are a function of the type or mode of action and can have one of two values, either "A" for "Add data rows", 66, or "C" for "Change data rows", 68. If the mode 34 field is left empty, then the mode of execution can be both "A" and "C" for that panel operation. At panel execution, the actions will be in the sequence they are specified in. Those actions valid for Add will be present in the Add mode in a subsequent panel actions pop-up window, and those actions valid for "Change" will be present in the "Change" mode. This, then, explains the significance of the user entries into the mode prompt 34 column.

Thus, returning to FIG. 9, at 70 the process requires definition of whether the panel action selected in the panel operation/command column 32 and corresponding action text 26 is for an "Add data" action. If Yes, a mode entry "A" is entered, 72. If the specified panel action is for a "Change data rows", 74, a "C" is entered at the appropriate location in the mode prompt column 34 as shown by step 76 in FIG. 9. If the panel action mode of execution can be both for adding and changing.. data, the appropriate mode location is left blank as shown at step 78.

Referring to FIG. 10, the process steps previously described with reference to FIGS. 8-9 are then repeated if it is desired to specify yet additional panel actions shown at step 80, whereupon the process loops back to 82 of FIG. 8. If, however, no more actions are desired to be specified, the designer has thus modified the fields in the window of FIG. 4 to contain all the actions needed for the panel. It will be noted at 82 that the action text for "Update balance" has a correlative command 82 instead of a panel operation entered in the panel operation/command column. In the embodiment being discussed, an action may have one command or one operation although the invention is not intended to be so limited.

When the designer completes the panel definition, it is determined at 84 whether it is desirable to save the definition. If Yes, the panel is saved as a panel object in the database in internal format, 86 and the process ends, 88; and, if No the process ends without such saving at 88. The invention, in part, converts the information from the panel actions window FIG. 4 as thus specified in accordance with the previously described steps into two dynamic pull-down window formats (one for "Add data rows" mode and one for "Change data rows" mode and saves them as part of the panel object.

Panel Execution

Now that the panel actions pop-up window has been filled in and the just-mentioned pull-down panel action windows resultant therefrom are specified, a general description will now be given as to how such subsequent panel action pull-down windows come into play in use of an application and the user interface. With reference to a panel execution flow diagram FIG. 11 and accompanying illustrative screens shown in FIGS. 5-7, the panel execution process begins at 84. "Panels" will be chosen from a main selection window, step 86, whereupon the name of a panel to be executed from the list of all panel definitions is selected, 88. By selecting "Run" from an appropriate actions pull-down on an application action bar, 90, a panel with blank fields will appear in accordance with step 92. With respect to the hereinbefore noted example (with reference to FIGS. 1-4), what this means is that the panel "order form" would be selected from the list of panels defined in accordance with FIGS. 1-4 and 8-10, and after selecting "Run" the panel execution window of FIG. 5 would appear. It will be noted that fields on the panel are displayed as blank. The cursor is shown as an underline in the first field, 94. When the user requests to execute or run a panel by first selecting the "Actions", 96, on the application bar, and step 98, a prompt is given at step 100 requesting user indication of the desired execution mode (i.e., whether the panel will be run in an "add data rows" mode or a "change data rows" mode).

The subsequent actions which can be taken in a correlative one of two pull-down panel action windows will hereinafter be determined by which mode is selected at this point by the user. Per step 102, if the "Change data rows" mode is selected, step 102, the actions pull-down window for the "Change data rows" mode is displayed as shown in FIG. 6. Conversely, if the "Add data rows" mode is selected at 100, the actions pull-down window for "Add data rows" mode shown in FIG. 7 is displayed. The data values for the particular panel of FIG. 6 or 7 are thence filled in by the user. The actions in the pull-down window (previously specified in terms of wording, mnemonics, selection of panel actions displayed therein, and control keys used for selection, and order per the panel definition flow diagram) are selected as shown at step 106, whereupon the process ends at 108.

Referring to FIG. 6, a comparison of the actions pull-down window 110 with the panel actions window after changes have been made (FIG. 4) will show that the window 110 contains only the actions specified in the window of FIG. 4 as mode equal "C" or mode equal "blank" (which, it will be recalled, refers to actions which may execute in either the Add or Change data mode). Moreover, the actions are listed in the order of occurrence in the panel actions window during panel definition. Furthermore, the selected actions are automatically numbered by the invention so that selection by number would be available as well as by cursor, mouse, mnemonic letter selection, and the various control keys. The first possible action for the user to select appears at the top of the list indicated by the cursor 112 as a default. When the user selects an action by the aforementioned method, the invention executes the selected panel operation or command previously defined in the panel actions window during panel definition with reference to FIGS. 1-4.

Referring to FIG. 7 in greater detail, again comparison of the pull-down window 114 depicted therein with FIG. 4, reveals that the actions contained in the window 114 are only those which were specified in FIG. 4 as mode="A" or mode="blank". Again, with reference to this pull-down window 114 as with window 110 of FIG. 6, interaction with the actions pull-down is identical. In other words, the user may select a listed action in one of five ways:

1. Moving the cursor over the action in the pull-down and pressing enter;
2. Using the mnemonic which is shown highlighted on monochrome displays and in a different color on color displays;
3. Using the function key if one has been assigned;
4. Using the number of the action in the action pull-down; and
5. Moving the mouse cursor on the action in the actions pull-down and clicking the mouse.

It will be noted that these interaction techniques are preferably identical throughout the entire application under consideration.

From the foregoing, it will be apparent that the invention provides the means for the panel designer to customize an actions pull-down to meet the needs of the panel user and to make interaction with the pull-down window consistent with all other pull-down windows in the product.

EXAMPLES

Now that an overall description of the function and operation of the invention has been given, application to a few specific examples will serve to further illustrate the significant unique features of the invention. In the examples under consideration, an education database will be used to build up a sample application for the invention. The structures of the tables in the database are depicted in FIG. 12 with the "—" indicating the fields in each table which form a unique key for the table whereby the relational data contained therein may be interrelated.

Figure 13:
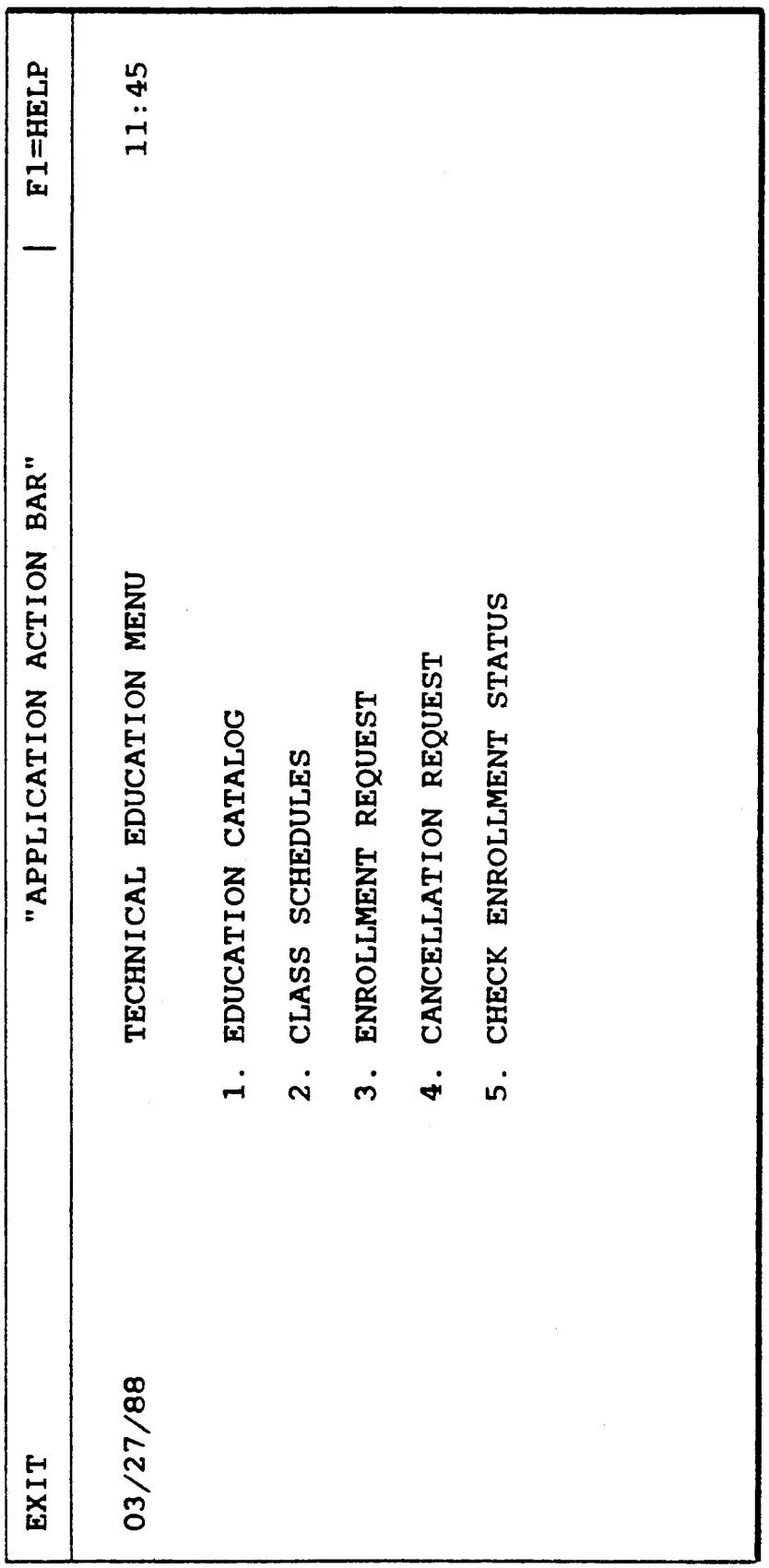

In the example under consideration, panels and pull-down windows will be created for use in an education application. In the application, various class schedules will be specified and changed and an enrollment in a class will be shown by use of user interface screens generated in accordance with the invention. In FIG. 13, there is a customized menu defined for the Education application. The items on the menu allow a user to review the education catalog, check the schedule of classes, enroll in a class, cancel enrollment and check enrollment status. The menu is pictured in FIG. 1. Each item on the menu is defined as a command in the product. The commands for the five items on the menu are:

1. RUN PANEL COURSE_DESCRIPTOR
2. RUN PANEL COURSE_SCHEDULE
3. RUN PANEL ENROLL (MODE=ADD)
4. RUN PANEL ENROLL (MODE=CHANGE)
5. RUN PANEL CHECK_ENROLL

Three panels are constructed: COURSE_SCHEDULE, ENROLL and CLASS_INFO. CLASS_INFO is a panel run from within the ENROLL panel. These panels and the Education application scenario that follows illustrate the use of the dynamic panel actions window.

Figure 14:
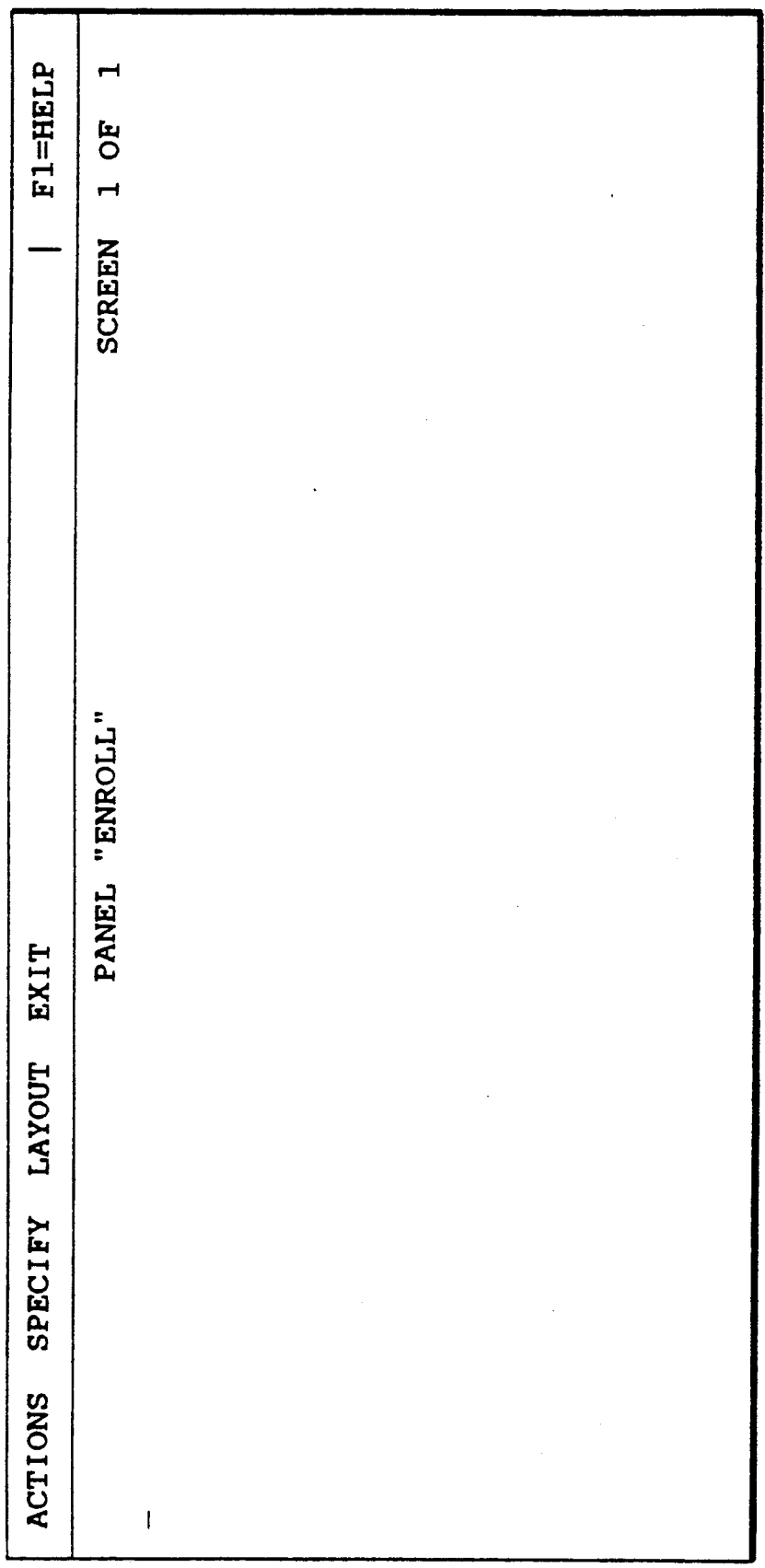
Figure 15:
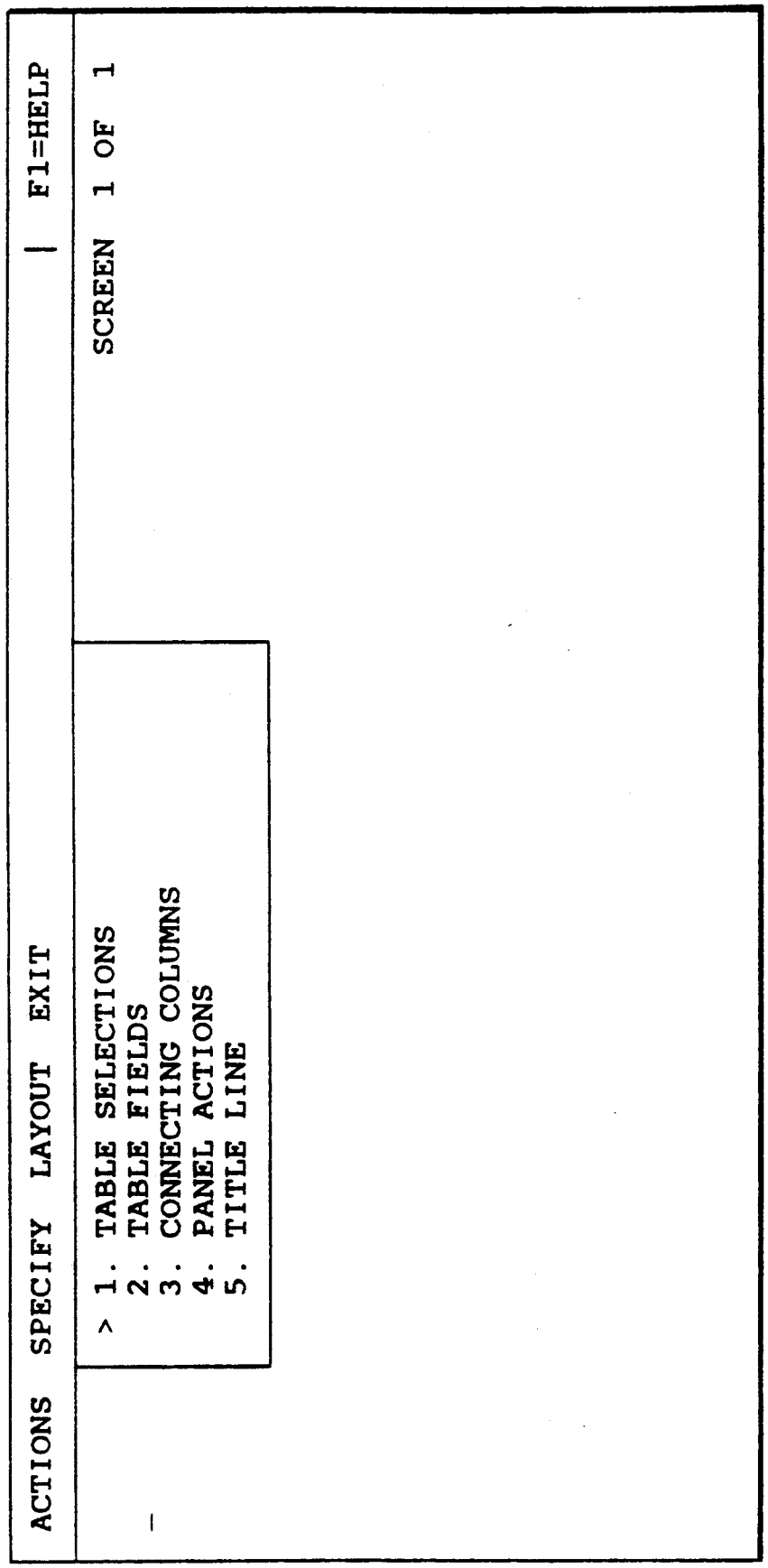
Figure 18:
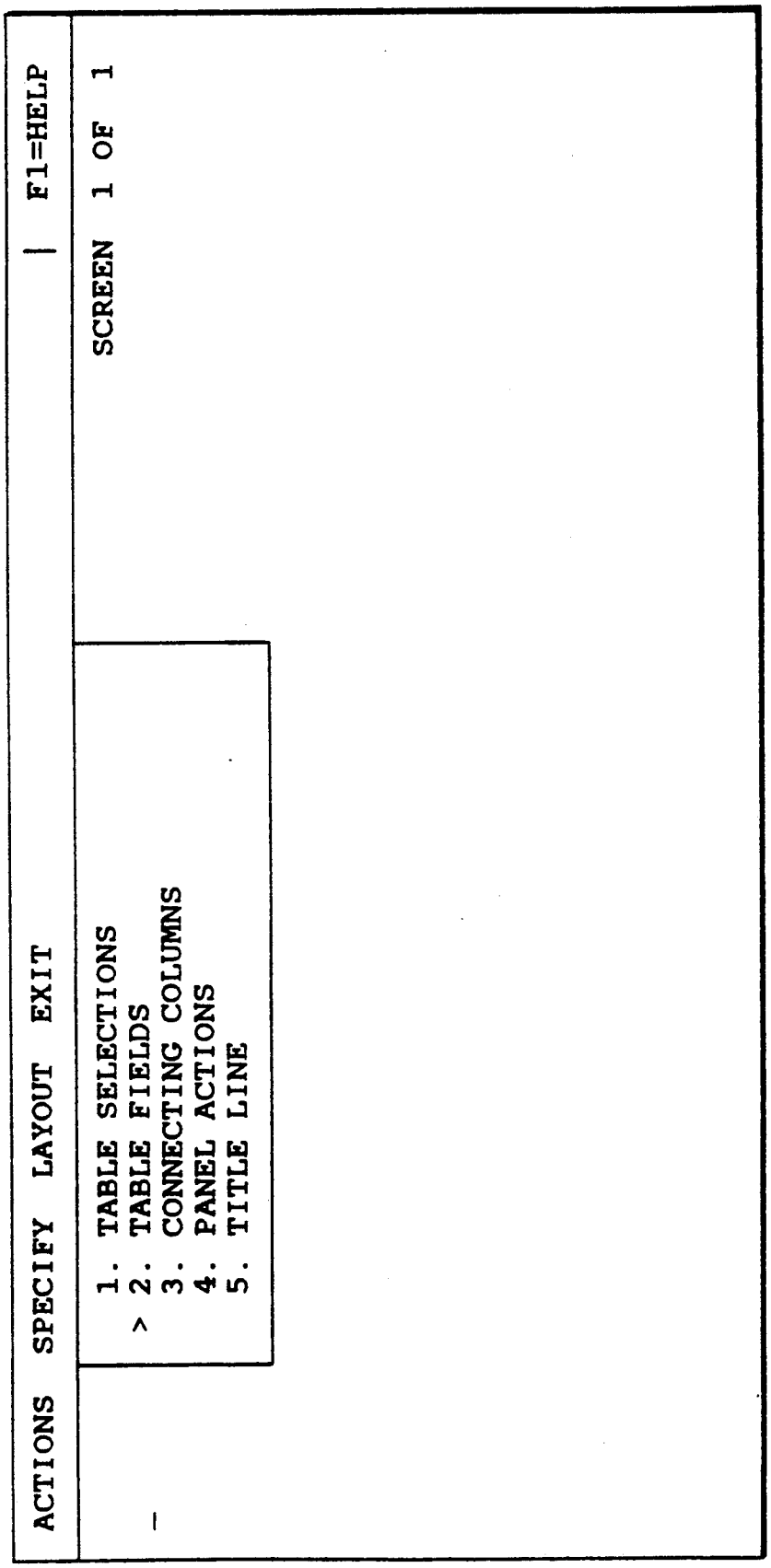
Figure 21:
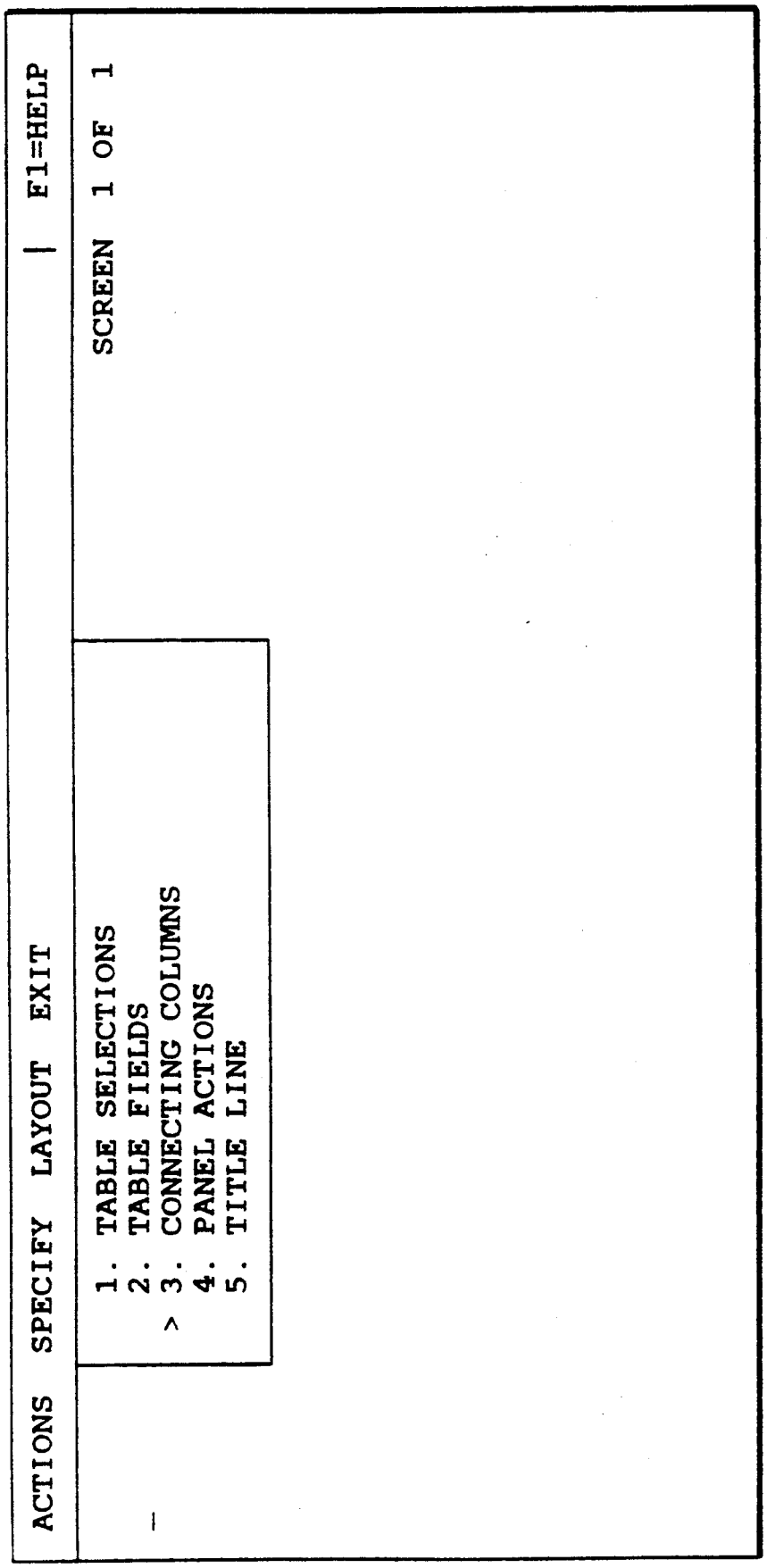

First, the user creates a new panel named ENROLL (FIG. 14). The panel is initially a blank screen with the cursor (shown as an underscore) in the upper left corner. The first step is to select the tables to be used in the panel (FIG. 15). "Table selections" in the Specify pull-down window is chosen. The Table Selections pop-up window appears (FIG. 16). No tables are initially filled in. The user is creating the ENROLL panel using the COURSE_ENROLL and EMPLOYEE tables. These tables are filled in the Table Selections pop-up (FIG. 17). Then the user must specify which fields from the selected tables are used in the ENROLL panel. "Table fields" in the Specify pull-down window is chosen (FIG. 18). The Table Fields pop-up window appears (FIG. 19). No table fields are initially filled in. The user fills in the columns from the 2 tables in the Table Fields pop-up window and assigns a panels field name, usage and width to these fields (FIG. 20). The user indicates the columns which connect the two tables in this panel by using the "Connecting columns" action in the Specify pull-down (FIG. 21). The Connecting Columns pop-up window is displayed with no fields filled in (FIG. 22). The user enters the connecting column information into the window (FIG. 23).

Next the user keys in the fields and background text information into the panel definition window. The field names from the Table Fields pop-up are used to mark the fields in the panel definition window. Instructions can be added to the panel as appropriate for the intended user of the panel (FIG. 24). The user defines the panel actions which can be performed on the panel by selecting the "Panel actions" in the Specify pull-down window (FIG. 25).

Default panel actions appear initially in the Panel Actions pop-up window. The mnemonic is a character which appears in the action text. The action key assigned as a default is consistent with similar functions available elsewhere in the product. All the panel operations available are listed with the action text equal to the panel operation (FIG. 26).

The user can reword the action text, assign a different mnemonic or action key to the panel action or delete the panel action from this panel. Panel actions can be added which execute a product command (such as Run Panel CLASS_INFO). The order that the actions will appear in the dynamic pull-down window is determined by the order in the Panel Actions pop-up (FIG. 27).

As the final step in defining the ENROLL panel, the user gives the panel a title by choosing the "Title line" action in the Specify pull-down window (FIG. 28). The Title Line pop-up window appears overlaying the panel definition (FIG. 29). Finally, user fills in the title (FIG. 30).

Figure 31:
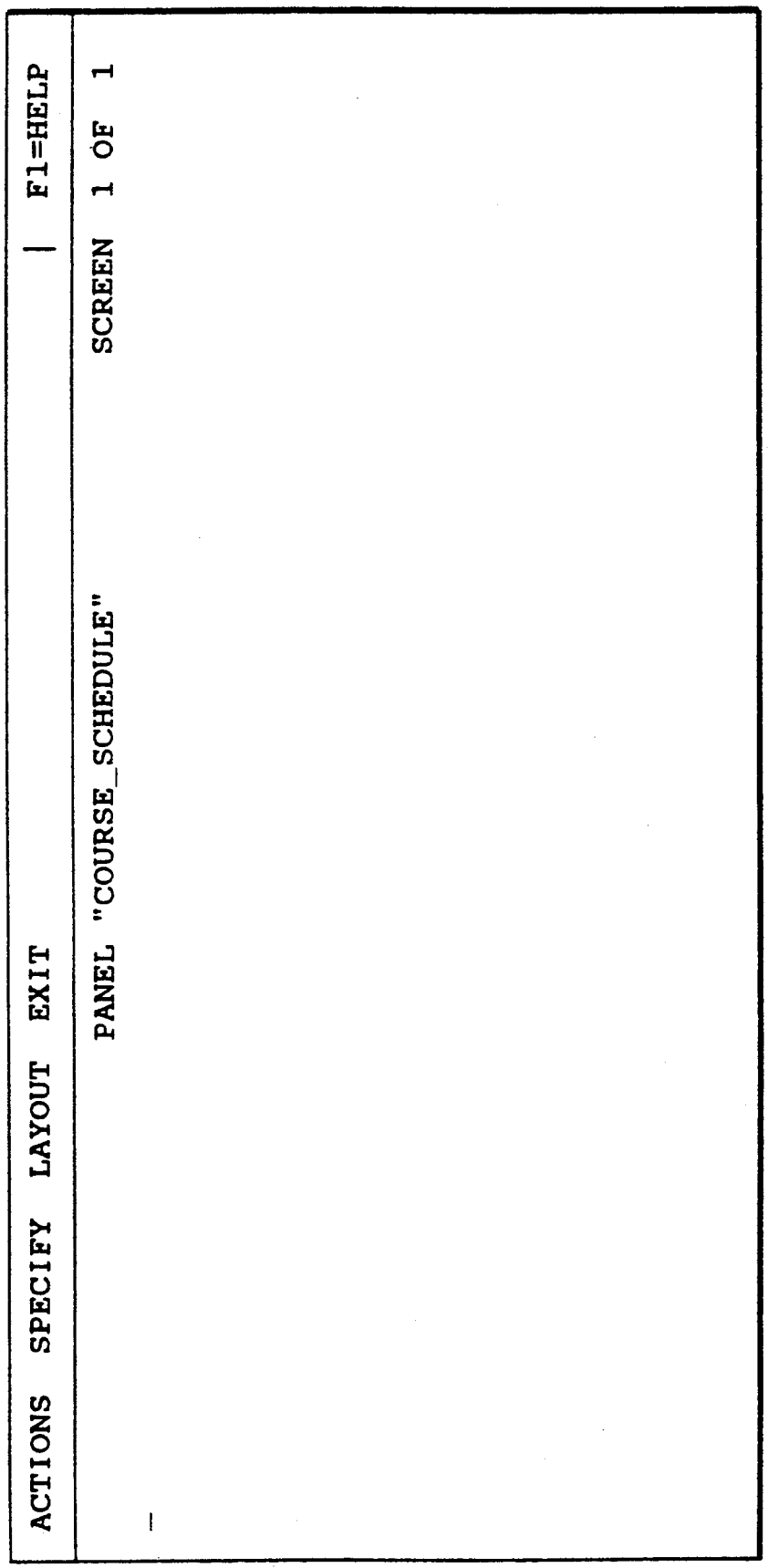
Figure 32:
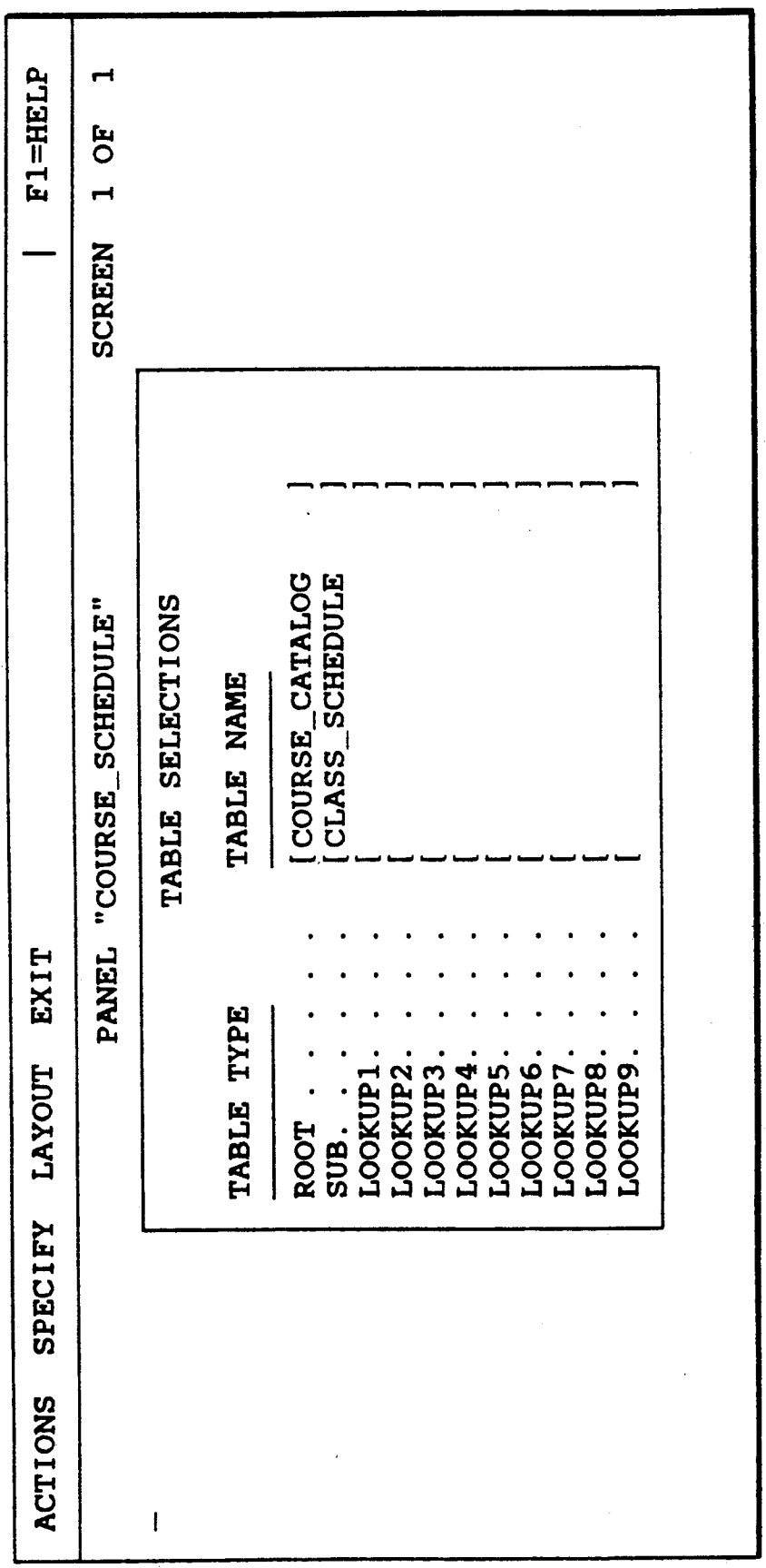

Next two other panels are defined. Screens showing the Specify pull-down windows and the initial pop-up windows are omitted since they are the same as in the previous sequence. The user defines a 2nd panel named COURSE_SCHEDULE (FIG. 31). The COURSE_SCHEDULE panel uses the COURSE_CATALOG and CLASS_SCHEDULE tables (FIG. 32). The fields in the 2 tables which are used in the panel are filled into the Table Fields pop-up window (FIG. 33). The columns connecting the root and sub tables are filled into the Connecting Columns pop-up window (FIG. 34). The COURSE_SCHEDULE panel definition is created in the definition window (FIG. 35). The panel actions are specified in the Panel Actions pop-up window (FIG. 36). The title is filled in the Title Line pop-up window (FIG. 37).

Figure 38:
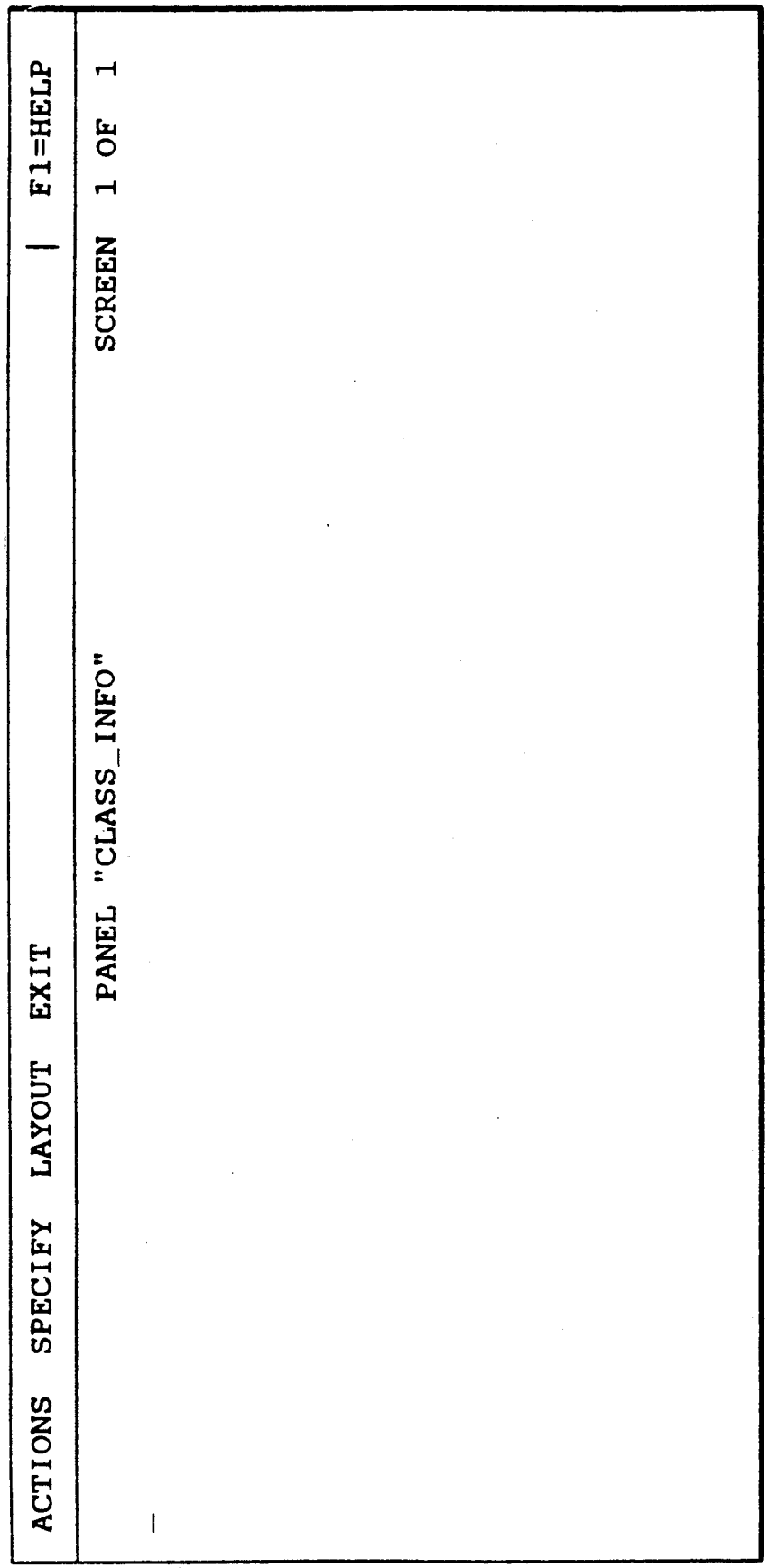

The user then defines a 3rd panel named CLASS_INFO (FIG. 38). The CLASS_INFO panel uses the CLASS_SCHEDULE and COURSE_CATALOG tables (FIG. 39). The fields in the 2 tables which are used in the panel are filled into the Table Fields pop-up window (FIG. 40). The columns connecting the root and lookup1 tables are filled into the Connecting Columns pop-up window (FIG. 41). The CLASS_INFO panel definition is created in the definition window (FIG. 42). The panel actions are specified in the Panel Actions pop-up window (FIG. 43). The title is filled in the Title Line pop-up window (FIG. 44).

Figure 46:
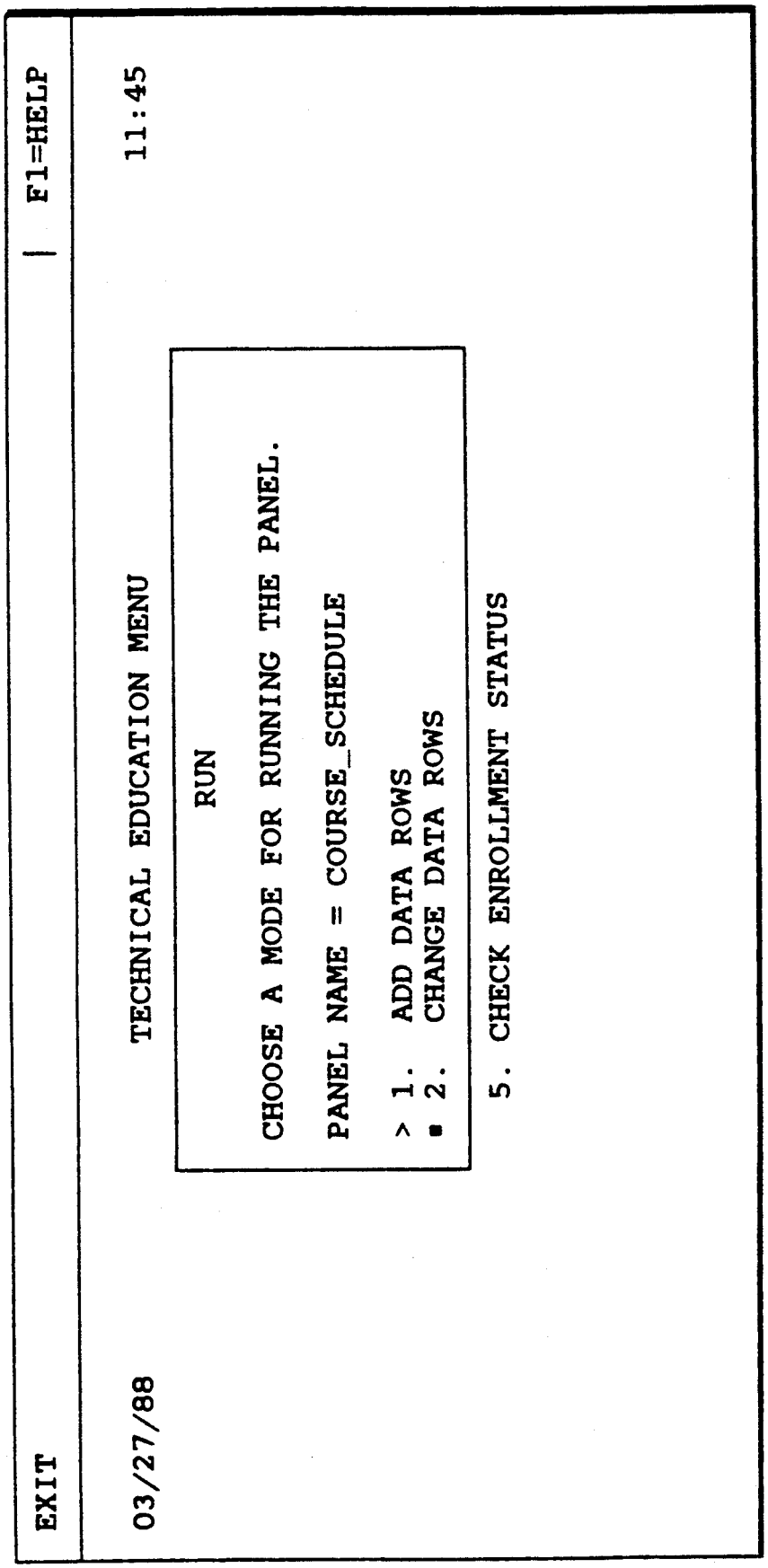

To run the Education application, the user starts with the menu. The class schedules are controlled by using item 2 on the menu (FIG. 45). When item 2 is selected from the menu, the product executes the command: RUN PANEL COURSE_SCHEDULE. The product prompts the user for a mode (Add/Change) (FIG. 46). The user chooses mode 1: Add data rows. A blank COURSE_SCHEDULE panel is displayed with the cursor in the first input field, Course (FIG. 47). The user fills in the class schedule data for course #8240 (FIG. 48). Then the user goes to the action bar and selects Actions. The Actions pull-down is dynamically created based on the Panel Actions definitions for Add mode (FIG. 49).

The user picks the first action, "Add sections". This action causes the panel operation defined for this action in the Panel Actions pop-up (Add and next) to be executed. Add causes the data rows to be added to the COURSE_SCHEDULE table in the database. The panel is redisplayed with all fields blanked and a message which indicates that the data rows have been successfully added. The next keystroke causes the message box to disappear (FIG. 50). If the user had chosen Change data rows in the Run panel mode pop-up, a blank COURSE_SCHEDULE execution panel is displayed (FIG. 51).

Figure 53:
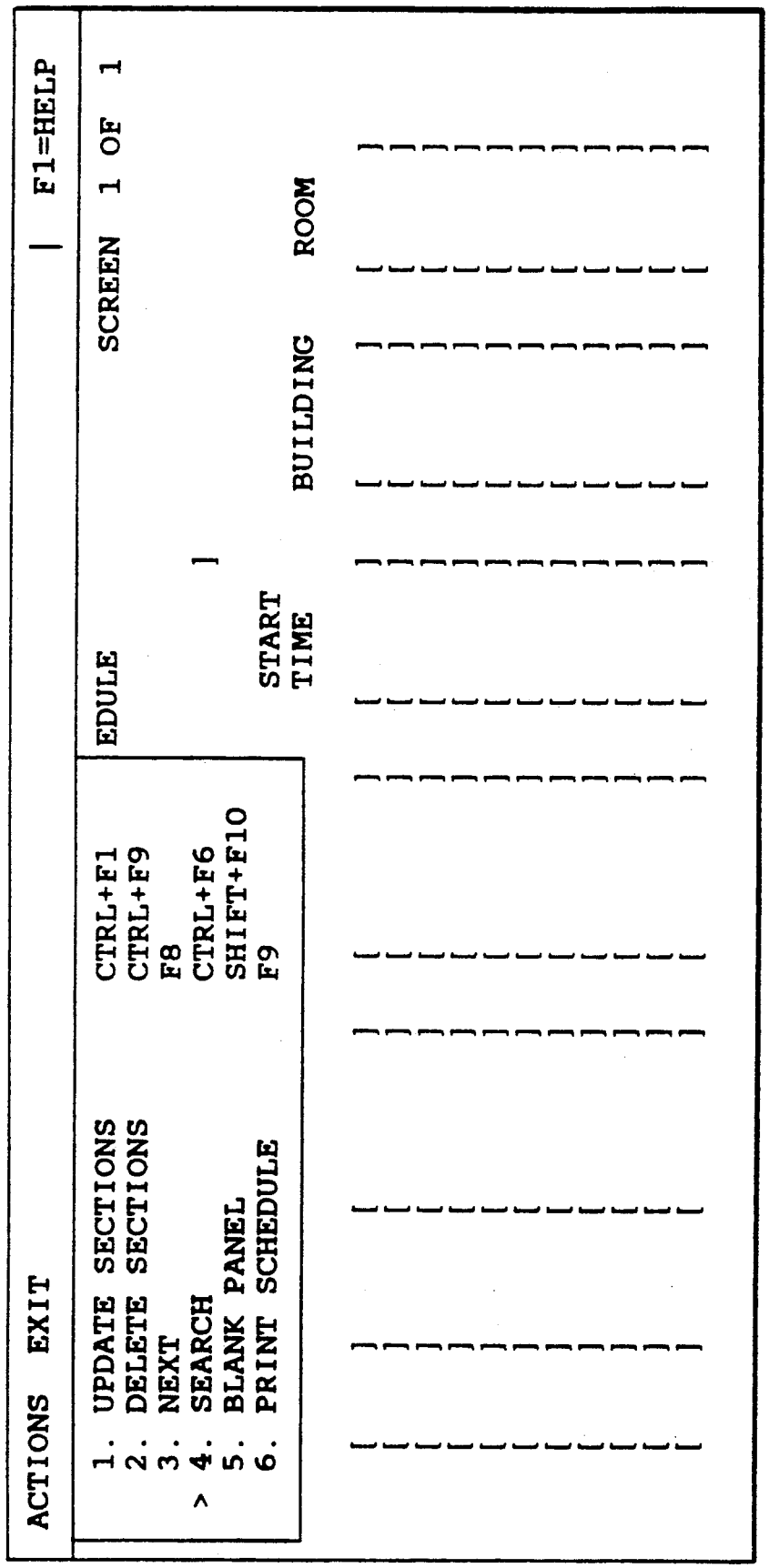

To update the class schedules for course 8240, the user fills in the course number (FIG. 52). The user goes to the action bar and selects the "Search" action from the Actions pull-down. The Actions pull-down is dynamically created based on the Panel Actions definitions for Change mode (FIG. 53). The database is searched for rows that correspond to the class schedule for course 8240 and these rows are displayed in the panel (FIG. 54). The user changes the class schedule (updates the start and end dates for section 8003 and 8004) (FIG. 55). The user goes to the action bar and selects the "Update sections" action from the Actions pull-down (FIG. 56).

The "Update sections" action causes the panel operation defined for this action in the Panel Actions pop-up (Change and next) to be executed. Change causes the data rows to be updated in the COURSE_SCHEDULE table in the database. The panel is redisplayed with all fields blanked and a message which indicates that the data rows have been successfully updated. The next keystroke causes the message box to disappear (FIG. 57).

A second example using the Education application (FIG. 58) will now be provided. When item 3 is selected from the menu, the product executes the command: RUN PANEL ENROLL (MODE=ADD). The mode is specified on the command, so the Run panel mode pop-up is bypassed. A blank ENROLL panel is displayed (FIG. 59). The user fills in the required fields: course no, section, employee serial, VM user ID and VM node (FIG. 60).

Next the user goes to the action bar and selects Actions. The Actions pull-down is dynamically created based on the Panel Actions definitions for Add mode. The "Fill in employee data" action is chosen (FIG. 61). The "Fill in employee data" action is defined as the Compute operation and causes any lookup table fields to be filled in. The fields from the EMPLOYEE table are retrieved from the database for the employee whose serial number is 295017 and are displayed in the panel (FIG. 62). The user goes to the action bar, this time choosing the "Check class info" action (FIG. 63).

The action defined for "Check class info" is RUN PANEL CLASS_INFO. The CLASS_INFO panel is displayed overlaying the ENROLL panel. Since there are no Add usage fields defined in the CLASS_INFO panel, it is only run in Change mode. The course and section are used as search arguments to generate the data (FIG. 64). The course abstract contains more information that can fit in the panel field. The "Show course abstract" action executes the Show field operation which displays the entire Abstract field in a scrollable pop-up window (FIG. 65). The user browses the panel and then exits, via the Exit action in the action bar, back to the ENROLL panel. The ENROLL panel is redisplayed (FIG. 66).

The user "enrolls" in the class by pressing Ctrl+F2, the function key assigned to the "Add and next" action. This key is displayed to the user in the Actions pull-down window. It can be pressed and take effect without going to the action bar and entering the Actions pull-down window (FIG. 67).

Figure 68:
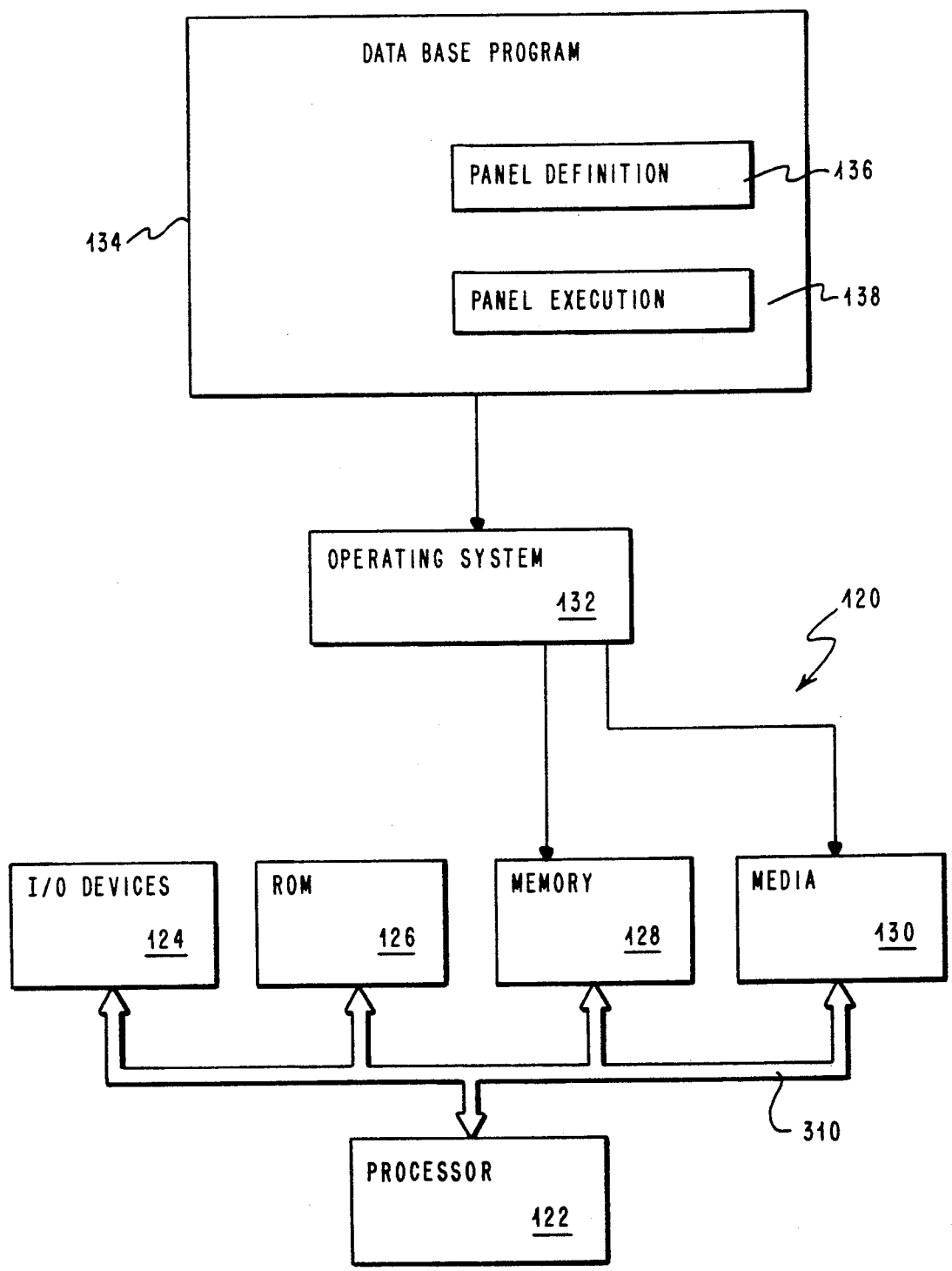
FIG. 68 is a functional block diagram of a computerized system for implementing the user interface and system and methods of the present invention hereinbefore described with reference to FIGS. 1-67.

With reference to FIG. 68, a block diagram is shown of a processing apparatus which may be used to run computer programs providing the previously described functions thereby implementing the system of the present invention. The system preferably takes the form of a typical personal computer architecture such as that embodied in the IBM Personal System/2. With respect to this system 120, a microprocessor 308 is provided such as an Intel 80286 or 80386 device which is interconnected to a desired selection of I/O devices 124, ROM 126, memory 128, and media 130 by means of a bus 310. It will be appreciated that in a conventional manner, the bus 310 will be comprised of address, command, and data lines for purposes well known in the art. The I/O devices 124 which may be included in the system 120 of the present invention may include a display such as an IBM Personal System Color Display 8510, a keyboard, mouse or the like for user input, and a printer if desired. It will also be appreciated that for purposes of simplicity, adapters have been omitted from FIG. 68 although it will be appreciated that such adapters for the various devices 124–130 may either be included as part of the IBM Personal System/2 or available as plug in options from the IBM Corporation.

Within the read only memory or ROM 126, the basic input/output operating system or BIOS is stored for execution by the processor 122. The BIOS, as is well known, controls the fundamental operations of the computer system 120. Additionally, an operating system 132 is provided such as OS/2 which will be loaded into memory 128 and will run in conjunction with the BIOS in ROM 126.

Additional information on the Personal System/2 and Operating System OS/2 which may used in a preferred embodiment to implement the system and methods of the present invention may be found in the following reference manuals herein incorporated by reference: IBM Operating System/2 Version 1.0 Standard Edition Technical Reference, IBM Corporation Part No. 6280201, Order No. 5871-AA, IBM Corporation, Manual, Personal System/2 (Model 80), IBM Corporation, Part No. 68X2256, Order No. S68X-2256; OS/2 Programmer's Guide, Iacobucci, Ed, McGraw Hill 1988; and IBM Operating System/2 Extended Edition Version 1.0 Technical Reference Use Publication #90X7939.

In accordance with the invention, an application program 134 is further provided which may be loaded into memory 128 or stored in media 130. This media 130 may be of any conventional form such as a hard file, diskettes associated with a disk drive, or the like. In accordance with OS/2, the data base application program 134 may be considered as an operating system 132 extension and will include numerous functions conventionally associated with a database program providing instructions to the processor 122 so as to enable the system 120 to perform relational database functions as hereinbefore described. The operator may interface with the database program through the various I/O devices 124, such interfacing including entering, accessing, changing, or deleting data from the database and other such tasks. For example, the user may interact with the database program 134 by inputting some form of data manipulation language command such as an SQL command well known in the art via the keyboard, whereupon the system 120 will query the data resident in the database and output the desired answer set for inspection by the user on a video terminal, printer, or the like.

It will be noted that software functions included in the database program 134 include panel definition functions 136 and panel execution functions 138. These functions, graphically and conceptually represented in FIG. 68 as part of the database program 134, will be recognized as performing the hereinbefore described functions of the present invention relative to custom definition of a user interface in the manner of the invention.

While the invention has been shown and described with reference to particular embodiments thereof, it will be understood by those skilled in the art that the foregoing and other changes in form and details may be made therein without departing from the spirit and scope of the invention.

I claim:

1. A computer implemented method for specifying a user interface to a database, comprising the steps of:
    displaying, by a computer implementation, a customizing window for defining panels which are used during runtime by a user interacting with said database, which customizing window includes:
        an action text prompt comprising a list of default or user specified descriptions each associated with a different run time panel action;
        a panel actions prompt including a list of said panel actions each associated with at least one of a plurality of run time panel execution modes; and
        a mode prompt including an indicator for each said run time panel action of its corresponding associated mode;
    user selecting, in response to said displayed customizing window prompts, one or more of said descriptions and their associated run time panel actions and mode indicators;
    user selecting, in response to said displayed customizing window prompts, one of said plurality of run time panel execution modes; and
    displaying, by a computer implementation, in a second window a subset of the selections as related by said selected panel execution mode.

2. The method of claim 1 wherein said plurality of run time execution modes includes an add data mode and a change data mode.

3. The method of claim 2 wherein said one of said selected plurality of panel execution modes is selected from a group comprised of said add data mode, said change data mode, and a blank mode.

4. The method of claim 3 wherein each of said panel actions is selected from a group comprising panel operations and commands.

5. The method of claim 4 wherein said subset comprises a subset of said specified plurality of action texts, and wherein said panel execution mode for each of said action texts of said subset corresponds to said selected panel execution mode.

6. The method of claim 5 wherein said displayed customizing window further includes at least one panel action specifier prompt; and selecting at least one panel action specifier for a corresponding at least one of said selected plurality of panel actions.

7. The method of claim 6 wherein said at least one panel action specifier prompt comprises
    a mnemonic prompt; and
    an action key prompt; and wherein said at least one panel action specifier comprises a mnemonic and an action key.

8. The method of claim 7 further including displaying a set of preselected default values for at least one of said prompts; and selecting at least one of said default values from said displayed set of default values.

9. The method of claim 8 wherein said subset of responses includes said selected at least one panel action specifier.

10. The method of claim 9 wherein said second window is displayed during a panel execution.

11. The method of claim 10 wherein selected ones of said action texts and said panel action specifiers define a substantially identical relative spatial positioning and order when displayed in said first and said second windows.

12. The method of claim 11 further including
    displaying in said customizing window a third window listing a plurality of said panel operations.

13. The method of claim 12 wherein at least one of said selected panel actions in one of said subsets corresponds to said change data execution mode and comprises a reset, print all, next, change, change and next, search, extended search, delete or next action.

14. The method of claim 12 wherein at least one of said selected panel actions in one of said subsets corresponds to said add data execution and comprises an add and next or previous action.

15. The method of claim 12 wherein at least one of said selected panel actions in one of said subsets corresponds to said blank panel action mode and comprises a print, blank panel, show field, or compute action.

16. A system for specifying a user interface, comprising:
    means for displaying a customizing window for defining panels in said user interface which are used during run time, which customizing window includes:
        an action text prompt comprising a list of default or user specified descriptions each associated with a different run time panel action,
        a panel actions prompt including a list of said panel actions each associated with at least one of a plurality of run time panel execution modes, and
        a mode prompt including an indicator for each said run time panel action of its corresponding associated mode;
    means for selecting in said customizing window a set of responses to said prompts comprised or one or more text descriptions and their associated panel actions;
    means for selecting through said customizing window one of a plurality of panel execution modes; and
    means for displaying in a second window a subset of the selections as related by said selected panel execution mode.

17. The system of claim 16 further including
    means for designating a plurality of panel actions in response to said displayed customizing window;
    means for designating one of a plurality of panel action modes for each said selected panel action in response to said displayed customizing window; and
    means for designating one of a plurality of action texts for each said selected panel action in response to said displayed customizing window; and wherein said plurality of panel action modes is functionally related to said plurality of panel execution modes.

18. The system of claim 17 wherein said means for displaying said customizing window includes means for displaying at least one panel action specifier prompt; and further includes means for selecting in response to said displayed customizing window at least one panel action specifier for a corresponding at least one selected plurality of panel actions.

19. The system of claim 18 wherein said means for selecting at least one panel action specifier comprises an action key.

20. A computer implemented method for defining a user interface to an application program comprising the steps of:

displaying, by a computer implementation, a first window;

user inputting in response to said first window a plurality of groups of panel-defining commands for defining panels in said user interface, each group including:
   at least one panel operation or command; and
   an execution mode for each said at least one panel operation or command;

user selecting a run time execution mode for said user interface; and dynamically generating by computer implementation a plurality of second windows each said second window selectively combining a different set of said groups of panel-defining commands determined as a function of said run time execution mode.

21. The method of claim 20 wherein said groups of panel-defining commands in a given one of said second windows includes execution mode commands corresponding to said selected execution mode.

22. The method of claim 21 further including the step of storing said generated second windows as a portion of an object of said panel.

23. The method of claim 22 further including the steps of executing said selected panel; and
displaying one of said second windows during said execution of said selected panel.

24. The method of claim 23 wherein said execution mode for each said at least one panel operation or command is selected from a group comprising an add data rows mode and a cnange data rows mode.

* * * * *